United States Patent
Natori et al.

(10) Patent No.: US 9,003,167 B2
(45) Date of Patent: Apr. 7, 2015

(54) DATA PROCESSING APPARATUS AND DATA PROCESSING METHOD

(75) Inventors: Ryoko Natori, Yokohama (JP); Shinji Shiraga, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 796 days.

(21) Appl. No.: 13/102,168

(22) Filed: May 6, 2011

(65) Prior Publication Data

US 2011/0283088 A1    Nov. 17, 2011

(30) Foreign Application Priority Data

May 14, 2010   (JP) ................................. 2010-112661

(51) Int. Cl.
    *G06F 9/50*    (2006.01)
(52) U.S. Cl.
    CPC .................................. *G06F 9/5066* (2013.01)
(58) Field of Classification Search
    None
    See application file for complete search history.

(56) References Cited

U.S. PATENT DOCUMENTS

| | | | |
|---|---|---|---|
| 4,014,000 A | 3/1977 | Uno et al. .......... 382/146.3 MA |
| 5,028,991 A | 7/1991 | Sekizawa et al. ............... 358/75 |
| 5,467,459 A * | 11/1995 | Alexander et al. ............. 711/153 |
| 5,668,631 A | 9/1997 | Norita et al. ................... 356/376 |
| 7,928,378 B2 | 4/2011 | Kimba et al. ................... 250/307 |
| 8,526,738 B2 | 9/2013 | Yashiro .......................... 382/181 |
| 8,655,057 B2 | 2/2014 | Kato et al. ..................... 382/159 |
| 2002/0120831 A1 * | 8/2002 | Wong et al. .................... 712/219 |
| 2002/0131056 A1 | 9/2002 | Fujii et al. ..................... 356/608 |
| 2003/0080977 A1 | 5/2003 | Scott et al. ..................... 345/629 |
| 2003/0156757 A1 | 8/2003 | Murakawa et al. ........... 382/195 |
| 2003/0163512 A1 | 8/2003 | Mikamo ......................... 709/102 |
| 2003/0226000 A1 * | 12/2003 | Rhoades ........................ 712/218 |
| 2004/0229210 A1 | 11/2004 | Sabry et al. ........................ 435/4 |
| 2005/0105605 A1 * | 5/2005 | Morsberger et al. .......... 375/225 |
| 2006/0182348 A1 | 8/2006 | Kinjo ............................. 382/203 |
| 2006/0200651 A1 * | 9/2006 | Collopy et al. ................ 712/220 |
| 2006/0224864 A1 * | 10/2006 | DeMent et al. ............... 712/219 |
| 2007/0292038 A1 | 12/2007 | Takemoto ...................... 382/240 |
| 2008/0034236 A1 * | 2/2008 | Takayama et al. ............ 713/322 |

(Continued)

FOREIGN PATENT DOCUMENTS

| | | |
|---|---|---|
| JP | 2009-116400 A | 5/2000 |
| JP | 2003-256221 | 9/2003 |

(Continued)

OTHER PUBLICATIONS

P. Viola et al., "Robust Real-time Object Detection", *Second International Workshop on Statistical and Computational Theories of Vision—Modeling, Learning, Computing, and Sampling*, pp. 1-25, Vancouver, Canada, Jul. 13, 2001.

*Primary Examiner* — Eric Coleman
(74) *Attorney, Agent, or Firm* — Fitzpatrick, Cella, Harper & Scinto

(57) ABSTRACT

A data processing apparatus includes a connecting unit that distributes the plurality of processing modules over the stages, and connects the plurality of processing modules such that a plurality of partial data are processed in parallel. The data processing apparatus detects, with respect to at least a part of the stages, a ratio of an amount of data for which processing in the subsequent stage has been executed, as a passage rate, acquires a processing time for a data amount to be processed in each stage, for which the passage rate was detected, based on the passage rate, and determines the number of processing modules distributed to each stage based on the data amount.

6 Claims, 19 Drawing Sheets

(56) References Cited

U.S. PATENT DOCUMENTS

| | | | |
|---|---|---|---|
| 2008/0271003 A1* | 10/2008 | Minor et al. | 717/151 |
| 2008/0292189 A1 | 11/2008 | Morimoto et al. | 382/181 |
| 2008/0317353 A1 | 12/2008 | Chien | 382/195 |
| 2009/0109230 A1* | 4/2009 | Miller et al. | 345/506 |
| 2009/0125706 A1 | 5/2009 | Hoover et al. | 712/225 |
| 2009/0208112 A1 | 8/2009 | Hamamura et al. | 382/195 |
| 2009/0295418 A1* | 12/2009 | Kobayashi | 324/763 |
| 2010/0119107 A1 | 5/2010 | Yashiro | 382/100 |
| 2010/0122063 A1* | 5/2010 | Mise et al. | 712/30 |
| 2012/0020567 A1 | 1/2012 | Natori et al. | 382/195 |

FOREIGN PATENT DOCUMENTS

| | | |
|---|---|---|
| JP | 2010-92123 A | 4/2010 |
| JP | 2010-102568 A | 5/2010 |

\* cited by examiner

FIG. 4A

EXAMPLE 1

| | PROCESSING TIME Tm | PASSAGE RATE p | ACCUMULATED PASSAGE RATE P |
|---|---|---|---|
| STAGE 0 | 1 | 1/2 | 1 |
| STAGE 1 | 1 | 1/2 | 1/2 |
| STAGE 2 | 1 | 1/2 | 1/4 |

| | NUMBER OF MODULES |
|---|---|
| STAGE 0 | 4 |
| STAGE 1 | 2 |
| STAGE 2 | 1 |

$$\text{PROCESSING TIME} * \text{ACCUMULATED PASSAGE RATE} = \frac{1*1}{\text{Num}[0]} = \frac{1*1/2}{\text{Num}[1]} = \frac{1*1/4}{\text{Num}[2]}$$

$$\therefore \text{Num}[0] : \text{Num}[1] : \text{Num}[2] = 4 : 2 : 1$$

FIG. 4B

EXAMPLE 2

| | PROCESSING TIME Tm | PASSAGE RATE p | ACCUMULATED PASSAGE RATE P |
|---|---|---|---|
| STAGE 0 | 1 | 3/4 | 1 |
| STAGE 1 | 1 | 1/3 | 3/4 |
| STAGE 2 | 1 | 1/4 | 1/4 |

| | NUMBER OF MODULES |
|---|---|
| STAGE 0 | 4 |
| STAGE 1 | 3 |
| STAGE 2 | 1 |

$$\text{PROCESSING TIME} * \text{ACCUMULATED PASSAGE RATE} = \frac{1*1}{\text{Num}[0]} = \frac{1*3/4}{\text{Num}[1]} = \frac{1*1/4}{\text{Num}[2]}$$

$$\therefore \text{Num}[0] : \text{Num}[1] : \text{Num}[2] = 4 : 3 : 1$$

FIG. 4C

EXAMPLE 3

| | PROCESSING TIME Tm | PASSAGE RATE p | ACCUMULATED PASSAGE RATE P |
|---|---|---|---|
| STAGE 0 | 1 | 1/4 | 1 |
| STAGE 1 | 2 | 1/2 | 1/4 |
| STAGE 2 | 4 | 3/4 | 1/8 |

$$\text{PROCESSING TIME} * \text{ACCUMULATED PASSAGE RATE} \over \text{NUMBER OF MODULES} = {1*1 \over \text{Num[0]}} = {2*1/4 \over \text{Num[1]}} = {4*1/8 \over \text{Num[2]}}$$

$\Longrightarrow \therefore \text{Num[0]} : \text{Num[1]} : \text{Num[2]} = 2 : 1 : 1$

| | NUMBER OF MODULES |
|---|---|
| STAGE 0 | 2 |
| STAGE 1 | 1 |
| STAGE 2 | 1 |

FIG. 4D

EXAMPLE 4

| | PROCESSING TIME Tm | PASSAGE RATE p | ACCUMULATED PASSAGE RATE P |
|---|---|---|---|
| STAGE 0 | 1 | 1/6 | 1 |
| STAGE 1 | 2 | 1/2 | 1/6 |
| STAGE 2 | 4 | 1/16 | 1/12 |

$$\text{PROCESSING TIME} * \text{ACCUMULATED PASSAGE RATE} \over \text{NUMBER OF MODULES} = {1*1 \over \text{Num[0]}} = {2*1/6 \over \text{Num[1]}} = {4*1/12 \over \text{Num[2]}}$$

$\Longrightarrow \therefore \text{Num[0]} : \text{Num[1]} : \text{Num[2]} = 3 : 1 : 1$

| | NUMBER OF MODULES |
|---|---|
| STAGE 0 | 3 |
| STAGE 1 | 1 |
| STAGE 2 | 1 |

FIG. 5

| EXAMPLE | PASSAGE RATE p | |
|---|---|---|
| | STAGE 0 | STAGE 1 |
| (1) | 3 / 20 | 1 / 3 |
| (2) | 1 / 3 | 4 / 5 |
| (3) | 4 / 5 | 3 / 4 |

EXAMPLE (1)
DURING PASSAGE RATE PROCESSING

MODULE THAT IS OPERATED OR SHUT
DOWN DEPENDING ON THE RESULT OF
THE PRECEDING STAGE

OPERATING MODULE   SHUTDOWN MODULE

EXAMPLE (2)
DURING PASSAGE RATE PROCESSING

EXAMPLE (3)
DURING PASSAGE RATE PROCESSING

EXAMPLE (1)
DURING PASSAGE RATE PROCESSING

20 MODULES

EXAMPLE (2)
DURING PASSAGE RATE PROCESSING

15 MODULES

EXAMPLE (3)
DURING PASSAGE RATE PROCESSING

FIG. 8A $$T[N] = \frac{Td[N]}{Num[N]} = \frac{Tm[N] * P[N]}{Num[N]} = \frac{1 * 1}{Num[0]} = \frac{1 * 1/2}{Num[1]} = \frac{1 * 1/4}{Num[2]} \Rightarrow \therefore Num[0] : Num[1] : Num[2] = 4 : 2 : 1$$

PLAN 1) Num[0] : Num[1] : Num[2] = 4 : 1 : 1

$$T[0] = \frac{1 * 1}{4} = \frac{1}{4}$$

$$T[1] = \frac{1 * 1/2}{1} = \frac{1}{2}$$

$$T[2] = \frac{1 * 1/4}{1} = \frac{1}{4}$$

PLAN 2) Num[0] : Num[1] : Num[2] = 3 : 2 : 1

$$T[0] = \frac{1 * 1}{3} = \frac{1}{3}$$

$$T[1] = \frac{1 * 1/2}{2} = \frac{1}{4}$$

$$T[2] = \frac{1 * 1/4}{1} = \frac{1}{4}$$

PLAN 3) Num[0] : Num[1] : Num[2] = 3 : 1 : 2

$$T[0] = \frac{1 * 1}{3} = \frac{1}{3}$$

$$T[1] = \frac{1 * 1/2}{1} = \frac{1}{2}$$

$$T[2] = \frac{1 * 1/4}{2} = \frac{1}{2}$$

PLAN 4) Num[0] : Num[1] : Num[2] = 2 : 3 : 1

$$T[0] = \frac{1 * 1}{2} = \frac{1}{2}$$

$$T[1] = \frac{1 * 1/2}{3} = \frac{1}{6}$$

$$T[2] = \frac{1 * 1/4}{1} = \frac{1}{4}$$

PLAN 5) Num[0] : Num[1] : Num[2] = 2 : 2 : 2

$$T[0] = \frac{1 * 1}{2} = \frac{1}{2}$$

$$T[1] = \frac{1 * 1/2}{2} = \frac{1}{4}$$

$$T[2] = \frac{1 * 1/4}{2} = \frac{1}{8}$$

FIG. 8B

| | OPTIONS FOR DETERMINING THE NUMBER OF MODULES | 1 | 2 | 3 | 4 | 5 | 6 | 7 | 8 | 9 | 10 |
|---|---|---|---|---|---|---|---|---|---|---|---|
| STAGE 0 | 4 | 4 | 3 | 3 | 2 | 2 | 2 | 1 | 1 | 1 | 1 |
| STAGE 1 | 2 | 1 | 2 | 1 | 3 | 2 | 1 | 4 | 3 | 2 | 1 |
| STAGE 2 | 1 | 1 | 1 | 1 | 2 | 1 | 2 | 3 | 1 | 2 | 3 | 4 |
| HIGHEST STAGE PROCESSING TIME | 1/4 | 1/2 | 1/3 | 1/2 | 1/2 | 1/2 | 1/2 | 1 | 1 | 1 | 1 |

F I G. 9A $$T[N] = \frac{Td[N]}{Num[N]} = \frac{Tm[N] * P[N]}{Num[N]} = \frac{1*1}{Num[0]} = \frac{2*1/4}{Num[1]} = \frac{4*1/8}{Num[2]} \Rightarrow \therefore Num[0] : Num[1] : Num[2] = 2 : 1 : 1$$

PLAN 1) Num[0] : Num[1] : Num[2] = 4 : 1 : 1

$$T[0] = \frac{1*1}{4} = \frac{1}{4}$$
$$T[1] = \frac{2*1/4}{1} = \frac{1}{2}$$
$$T[2] = \frac{4*1/8}{1} = \frac{1}{4}$$

PLAN 2) Num[0] : Num[1] : Num[2] = 3 : 2 : 1

$$T[0] = \frac{1*1}{3} = \frac{1}{3}$$
$$T[1] = \frac{2*1/4}{1} = \frac{1}{4}$$
$$T[2] = \frac{4*1/8}{2} = \frac{1}{2}$$

PLAN 3) Num[0] : Num[1] : Num[2] = 3 : 1 : 2

$$T[0] = \frac{1*1}{3} = \frac{1}{3}$$
$$T[1] = \frac{2*1/4}{1} = \frac{1}{2}$$
$$T[2] = \frac{4*1/8}{2} = \frac{1}{4}$$

PLAN 4) Num[0] : Num[1] : Num[2] = 2 : 3 : 1

$$T[0] = \frac{1*1}{2} = \frac{1}{2}$$
$$T[1] = \frac{2*1/4}{3} = \frac{1}{6}$$
$$T[2] = \frac{4*1/8}{1} = \frac{1}{2}$$

PLAN 5) Num[0] : Num[1] : Num[2] = 2 : 2 : 2

$$T[0] = \frac{1*1}{2} = \frac{1}{2}$$
$$T[1] = \frac{2*1/4}{2} = \frac{1}{4}$$
$$T[2] = \frac{4*1/8}{2} = \frac{1}{4}$$

PLAN 6) Num[0] : Num[1] : Num[2] = 2 : 1 : 3

$$T[0] = \frac{1*1}{2} = \frac{1}{2}$$
$$T[1] = \frac{2*1/4}{1} = \frac{1}{2}$$
$$T[2] = \frac{4*1/8}{3} = \frac{1}{6}$$

F I G. 9B

| OPTIONS FOR DETERMINING THE NUMBER OF MODULES | 1 | 2 | 3 | 4 | 5 | 6 | 7 | 8 | 9 | 10 |
|---|---|---|---|---|---|---|---|---|---|---|
| STAGE 0 | 2 | 4 | 3 | 3 | 2 | 2 | 2 | 1 | 1 | 1 | 1 |
| STAGE 1 | 2 | 1 | 2 | 1 | 3 | 2 | 1 | 4 | 3 | 2 | 1 |
| STAGE 2 | 1 | 1 | 1 | 2 | 1 | 2 | 3 | 1 | 2 | 3 | 4 |
| HIGHEST STAGE PROCESSING TIME | 1/2 | 1/2 | 1/2 | 1/2 | 1/2 | 1/2 | 1/2 | 1 | 1 | 1 | 1 |
| SECOND HIGHEST STAGE PROCESSING TIME | 1/2 | 1/2 | 1/3 | 1/3 | 1/2 | 1/4 | 1/2 | 1 | 1 | 1 | 1 |
| THIRD HIGHEST STAGE PROCESSING TIME | 1/2 | 1/4 | 1/4 | 1/4 | 1/6 | 1/4 | 1/6 | 1 | 1 | 1 | 1 |

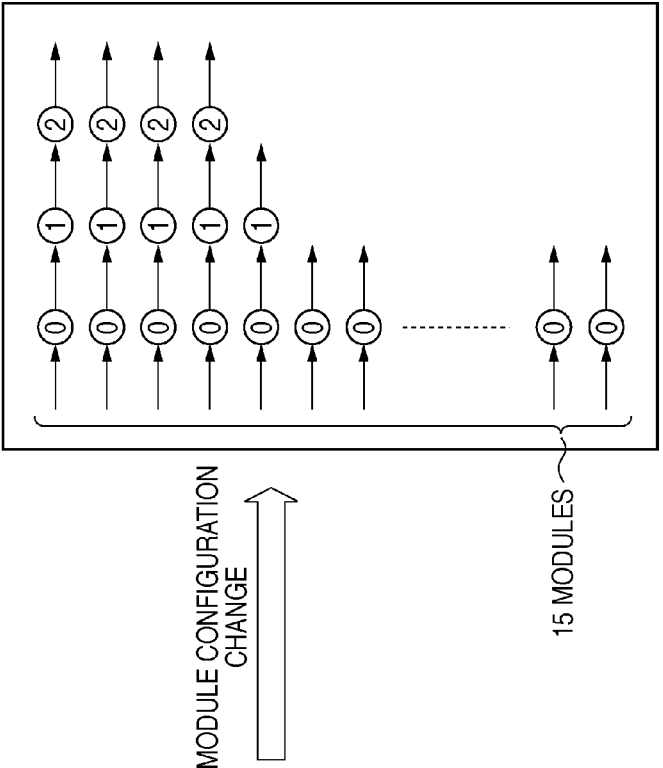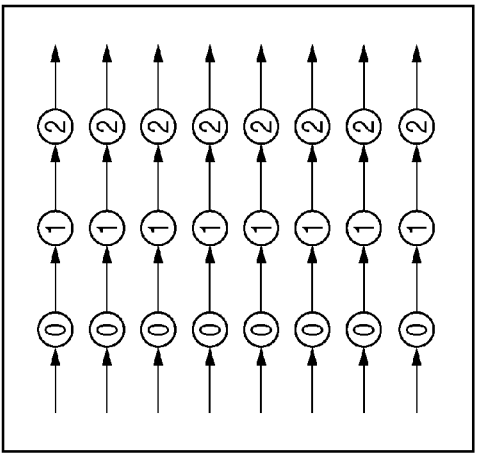

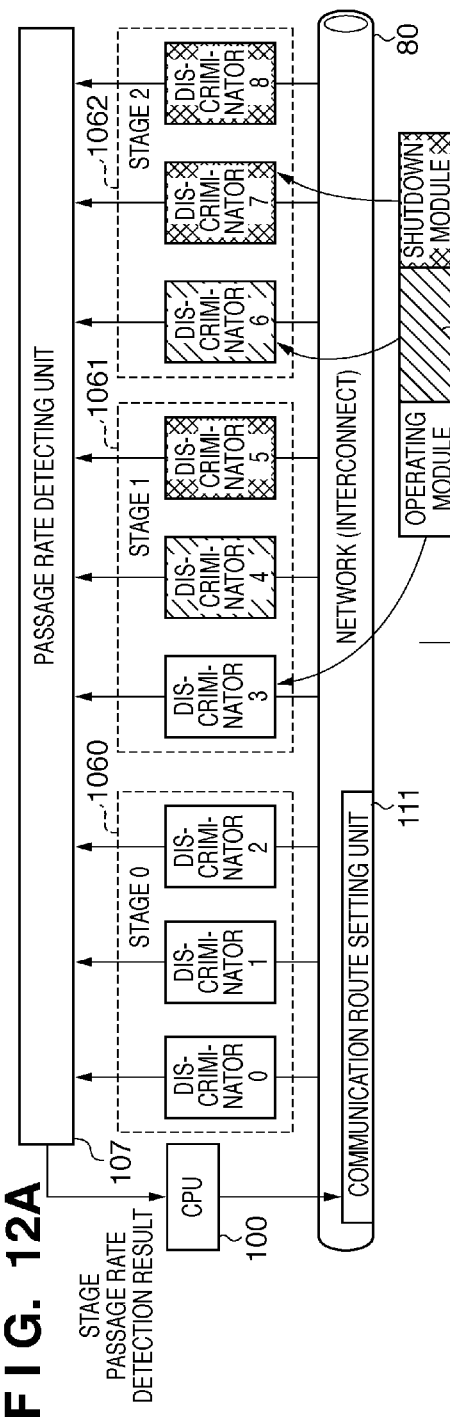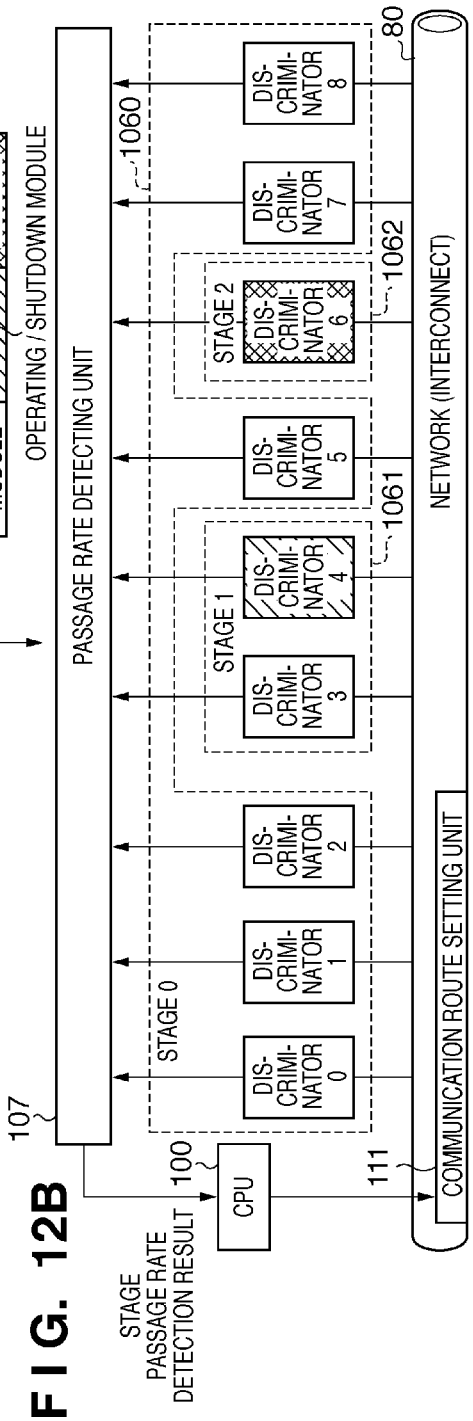

FIG. 15A
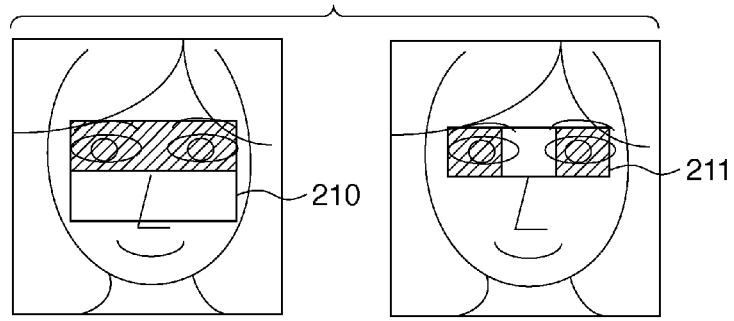
FIG. 15B    FIG. 15C    FIG. 15D
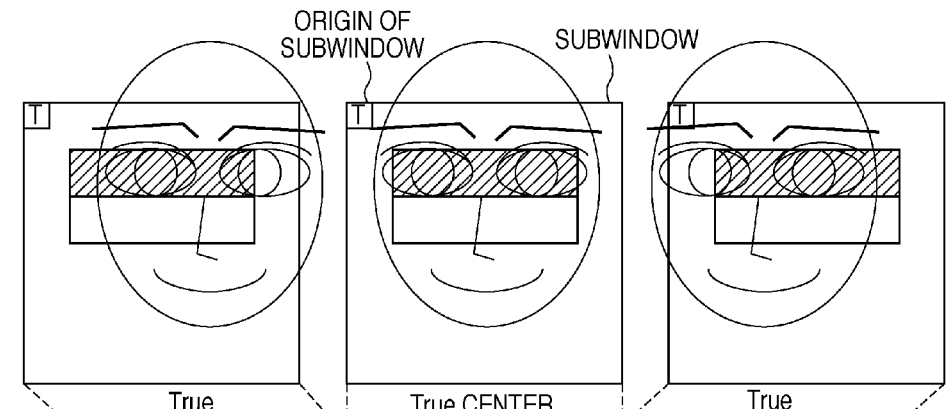
FIG. 15E

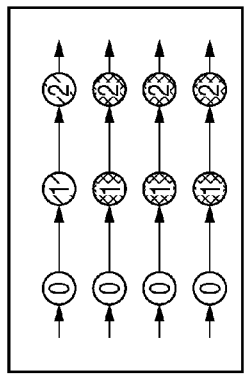
F I G. 17F
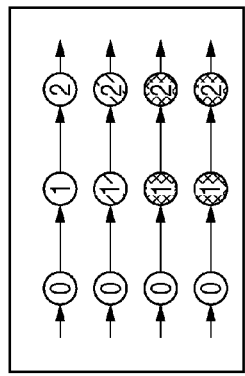
F I G. 17G
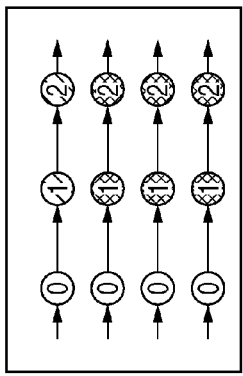
F I G. 17H
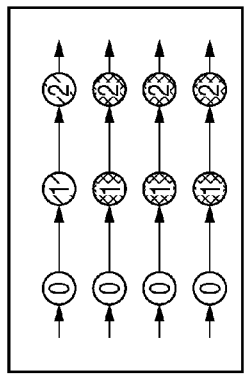
F I G. 17C
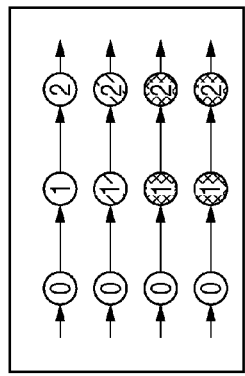
F I G. 17D
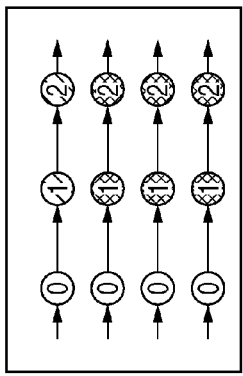
F I G. 17E
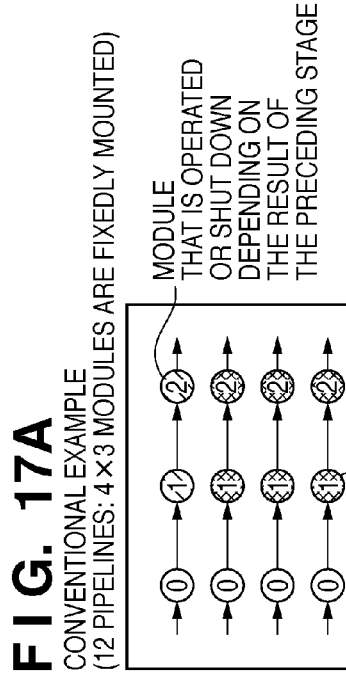
F I G. 17A
CONVENTIONAL EXAMPLE
(12 PIPELINES: 4×3 MODULES ARE FIXEDLY MOUNTED)
MODULE THAT IS OPERATED OR SHUT DOWN DEPENDING ON THE RESULT OF THE PRECEDING STAGE
SHUTDOWN MODULE
OPERATING MODULE
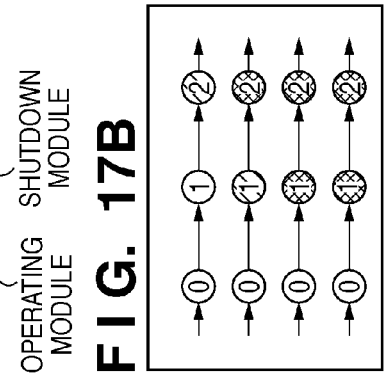
F I G. 17B

DATA PROCESSING APPARATUS AND DATA PROCESSING METHOD

BACKGROUND OF THE INVENTION

1. Field of the Invention

The present invention relates to a data processing apparatus in which a plurality of processing modules are connected in series and cascade processing is performed in which it is determined whether or not a subsequent processing is executed depending on a current processing result, and a control method thereof.

2. Description of the Related Art

Generally, technology has been proposed, for use in digital cameras and printers, to detect a particular object such as a person or a face in an input image and performs processing suitable for the detected object. Face detection processing for performing skin color correction processing on the face is an example of detecting a particular object. As the human face detection processing, a variety of methods have been proposed such as the method (called Viola & Jones method) proposed by P. Viola and M. Jones, in "Robust Real-time Object Detection", SECOND INTERNATIONAL WORKSHOP ON STATISTICAL AND COMPUTATIONAL THEORIES OF VISION, Jul. 13 2001 (hereinafter referred to as Document 1), and methods that utilize symmetrical features of the human face, template matching, neural networks and the like.

With the Viola & Jones method, a plurality of identification processes are executed based on the results (feature amounts) of Adaboost learning. These identification processes are implemented by cascade processing, and each identification process outputs, as a result of having performed identification, either True when the next identification process is to be performed or False when the next identification process is not to be performed. If the identification process is False, the identification process ends. FIG. 15A shows example feature amounts obtained as a result of the learning used in such processing. A feature amount 210 exhibits the feature that, when a small rectangular portion around the eyes is compared with a portion beneath the eyes (cheek portion), the portion around the eyes is darker than the portion beneath the eyes. A feature amount 211 exhibits the feature that, in the portion around the eyes, the portion of each eye is dark and the glabellar portion between the eyebrows is lighter than the portion of each eye. Input data are compared to such results of learning (learnt feature amounts), and if True is output for all of the feature amount identification processes, it is determined that the input data indicate a (human) face.

Also, with the Viola & Jones method, identification processing is sectioned into sections (hereinafter referred to as stages), True/False identification is performed for each stage, and thereby identification of face or non-face is performed. Also, earlier stages use only a simple feature so that the probability of a false negative (determination of a face as non-face, or an oversight) is minimized and the probability of a false positive (determination of a non-face as face, or an erroneous detection) is relatively high. Using only simple features enables identification processing with a reduced number of computations, and thus high-speed processing is possible even when the processing is performed using processors. Furthermore, in order to detect a face exisiting in a part of an entire image, a rectangular region is clipped from the entire image to identify the clipped region. According to the above-described method, more rectangular regions can be efficiently identified as False (non-face) in earlier stages, and thus the face detection processing over the entire image can be completed in a short time.

When rectangular regions are clipped from an entire image to carry out the identification processing sequentially on the rectangular regions, several methods are conceivable to determine the order in which rectangular regions are clipped. Widely used is a method in which scanning is performed pixel by pixel in the main scanning direction (horizontal direction) with the pixel on the upper left of the image set as a starting point. This scanning method will be described with reference to FIG. 14A. Strip-shaped regions created by dividing an input image in the main scanning direction by the height of a rectangular region on which the identification processing is performed are called bands. In FIG. 14A, Band_A is a band whose top corner is the pixel on the upper left of the input image. Band_a is a band whose top corner is the pixel at a position shifted in the sub-scanning direction (vertical direction) by one pixel from the top corner of Band_A. In this scanning method, first, the pixel on the upper left of the input image is set as a starting point, and identification processing is performed on a rectangular region (subwindow) in which the upper left pixel of the rectangular region coincides with the starting point. Next, the identification processing is performed sequentially on rectangular regions at positions each shifted by one pixel in the main scanning direction until the right edge of a rectangular region coincides with the right edge of the input image. The processing on Band_A is completed at this time. Next, the pixel at a position shifted by one pixel in the sub-scanning direction from the starting point used when Band_A was processed is set as a starting point, and the identification processing is performed sequentially on rectangular regions at positions each shifted by one pixel in the main scanning direction until the right edge of a rectangular region coincides with the right edge of the input image. The processing on Band_a is completed at this time. After that, the processing is performed on each band with a shift by one pixel in the sub-scanning direction until the lower edge of a rectangular region coincides with the lower edge of the input image.

The transition of the identification result from False to True and then from True to False as scanning proceeds in an initial stage (stage 0) of the identification processing, when sequential identification processing is performed using the scanning method described above, will be described with reference to FIGS. 15A to 15E. It is assumed that in the stage 0, the identification processing is performed using the feature amount 210 shown in FIG. 15A. FIGS. 15B to 15E are diagrams showing relative positions between the feature amount 210 and a face portion when, with respect to a face portion of the input image, rectangular regions are scanned in the main scanning direction. At a rectangular region position shown in FIG. 15C, the face is positioned substantially at the center of rectangular regions, and thus True (likely to be a face) is determined as a result of comparison against the feature amount 210. FIGS. 15B and 15D respectively show left and right edge rectangular regions that are determined to be True (likely to be a face) as a result of comparison against the feature amount 210. In other words, a rectangular region at the position shifted by one pixel to the left from FIG. 15B is determined as False (non-face) and a rectangular region at the position shifted by one pixel to the right from FIG. 15D is also determined as False (non-face) as a result of identification. FIG. 15E shows the transition of the identification result from False to True and then from True to False as scanning proceeds in FIG. 15A to FIG. 15D.

When the identification processing is performed with shifting the rectangular region little by little, as described above, the identification result repeatedly transitions from False to True and then from True to False as scanning proceeds. On this occasion, the frequency of occurrence of True and False varies according to the density of face portions included in the input image. How the frequency of occurrence of True and False varies in the stage 0 due to the density of face portions will be described with reference to FIGS. 16A to 16C. In FIGS. 16A to 16C, T is shown in the upper left of a rectangular region whose identification result was True, and F is shown in the upper left of a rectangular region whose identification result was False.

FIG. 16A shows an example in which there is only one face portion within one band. Nine Ts (True) are in succession and thereafter 27 Fs (False) are in succession with the progress of scanning. FIG. 16B shows an example in which two face portions are spaced apart from each other within the same band. Nine Ts (True) are followed by 6 Fs (False), and further 9 Ts (True) are followed by 6 Fs (False). FIG. 16C shows an example in which two face portions are adjacent to each other within the same band. Nine Ts (True) are followed by one F (False), and further 9 Ts (True) are followed by one F (False).

It can be seen from the foregoing that whichever of True and False, which are the output results from discriminators used in the face detection processing, has a higher frequency of occurrence depends on the density of face portions included in the input image. In the face detection, the identification processing is sectioned into stages, and True or False is determined for each stage. Hereinafter, the probability of occurrence of True in each stage is referred to as "passage rate". In the case of FIG. 16A, the passage rate of the stage 0 is calculated from the ratio between T (True) and F (False) to be 1/4. Likewise, the passage rate is 3/5 in the case of FIG. 16B, and the passage rate is 9/10 in the case of FIG. 16C.

Next, a description will be given of the relationship between the passage rate of each stage and the probability (accumulated passage rate) that True is returned as an identification result successively from the initial stage to a particular stage in cascade processing in which a plurality of stages are connected in series.

The total number of processes (the number of input rectangular regions) of the first or leading stage of the identification processing is defined as S. Only the rectangular regions identified as True in the first stage of the identification processing, which is the preceding stage, are input to the next second stage of the identification processing. Accordingly, the data amount, or in other words, the number of rectangular regions, processed by the second stage of the identification processing will be the product (S*p[1]) obtained by multiplying the number of rectangular regions processed by the first stage of the identification processing by the passage rate p[1] of the first stage of the identification processing. Furthermore, the data amount, or in other words, the number of rectangular regions, processed by the third stage of the identification processing amounts to the product, (S*p[1])*p[2], obtained by multiplying the number of rectangular regions processed by the second stage of the identification processing by the passage rate p[2] of the second stage of the identification processing. Hereinafter, with the same calculation, the data amount, or in other words, the number of rectangular regions, processed by the Nth stage of the identification processing can be represented as follows:

S*p[0]*p[1]* . . . *p[N−2]*p[N−−1].

Hereinafter, p[0]*p[1]* . . . *p[N−1] is referred to as the accumulated passage rate P[N] of the identification processing in the stage N. Also, P[0]=1 because all of the input data is input to a discriminator in the first stage (the data is input to the discriminator in the first stage with a passage rate of 100%).

As described earlier, the passage rate varies depending on the type of input image and the processing position within the image (the position of a rectangular region to be processed). In other words, the passage rate of an image having a high face density such as a group photograph generally is higher than the passage rate of an image having a low face density such as a landscape photograph. Also, even in a group photograph, in the case of the input image having a landscape in the upper portion of the photograph and people in the lower portion of the photograph, the face density is higher in the lower portion of the photograph. Accordingly, the passage rate during identification processing on the lower portion (people portion) of the photograph having a high face density is generally higher than the passage rate during identification processing on the upper portion (landscape portion) of the photograph having a low face density.

How the accumulated passage rate varies depending on the type of input image and the processing position within the input image will be described specifically with reference to FIGS. 14A, 14B and 14C. FIG. 14A is an example of a group photograph including a relatively large number of face portions in the input image. The average accumulated passage rate at each stage is plotted in a graph shown in FIG. 14C for Band_A, Band_B, Band_C and Band_D shown in FIG. 14A. In bands having a low face density such as Band_A, almost all of the rectangular regions are determined as non-face by the identification processing of the stage 0, and thus the average accumulated passage rate in the stage 1 is substantially 0%. On the other hand, in bands having a high face density such as Band_D, a large number of rectangular regions are determined as likely to be a face in all of the stages, and thus the average accumulated passage rate in the stage 2 is 50% or more. As can be seen from the foregoing, even in an input image having a high face density overall, the accumulated passage rate varies significantly depending on the processing position.

On the other hand, FIG. 14B is an example of a group photograph including a smaller number of face portions in the input image than the group photograph of FIG. 14A. In the graph of FIG. 14C, the average accumulated passage rate at each stage is also plotted for Band_X, Band_Y and Band_Z shown in FIG. 14B. The average accumulated passage rate in Band_X is similar to that of Band_A of FIG. 14A, but in Band_Z having the highest face density in FIG. 14B, the average accumulated passage rate at the stage 2 is below 50%. In other words, in different input images as shown in FIGS. 14A and 14B, the average accumulated passage rate varies significantly even at the same processing position.

The identification processing as typified by the Viola & Jones method is implemented by the multistage cascade processing composed of a plurality of stages, and by determining more rectangular regions as non-face in earlier stages, high-speed processing is achieved. However, as described above, the probability that non-face is determined in each stage varies significantly depending on the type of input image and the processing position within the input image.

Recently, more and more digital cameras and the like are equipped with a face detection function. In the future, in addition to simply incorporating such a function, demand will also increase for high-speed processing so that the face detection processing can be performed in real-time during image capture. General methods for speeding up not only the identification processing but also data processing include increasing the operating frequency, and internally providing a FIFO or RAM in order to prevent rate-limiting in transfer of input/output data. Also, methods for temporally/spatially parallelizing the processing are widely used. With temporally parallel processing (pipeline processing), dedicated discriminators are mounted and connected in cascade manner for stages executed in series so that the discriminators mounted for the stages can be simultaneously operated in parallel, and therefore high-speed processing can be achieved. However, the longest of the processing times of the stages rate-limits the overall processing time. Accordingly, provided that, in all of the stages, the passage rate is 100% and the processing times are uniform, the processing speed can be increased by an amount corresponding to the number of stages (by 4 times if there are 3 stages).

Spatially parallel processing is a speed-up technique in which, in order to further speed up the above-mentioned pipeline processing, a plurality of pipelines are mounted to simultaneously process a plurality of input data pieces. With the spatially parallel processing, if input data can be supplied smoothly to each pipeline processing, the processing speed can be increased by the amount of spatial parallelization (by 4 times if 4 pipelines are mounted). Accordingly, with a configuration in which 4 pipelines, each having 3 stages, are mounted using 12 discriminators, theoretically, the processing speed can be increased by 12 times.

As described above, in order to speed up the identification processing in face detection, according to the conventional technology, the temporally parallel processing and the spatially parallel processing are combined to achieve a performance improvement. For example, the conventional technology tries to, by mounting 12 discriminators, improve performance by an amount corresponding to the number of pipeline stages×the degree of spatial parallelism (12 times in the above example) compared to the configuration in which one discriminator is mounted.

However, as described earlier, the average accumulated passage rate varies greatly depending on the type of input image and the processing position within the input image. When the face density is high, it is possible to improve the performance by an amount close to the amount corresponding to the number of pipeline stages×the degree of spatial parallelism, but when the face density is low, the performance improvement does not come close to the amount corresponding to the number of pipeline stages×the degree of spatial parallelism. In other words, the speed-up technique using temporally/spatially parallel processing according to the conventional technology is problematic in that sufficient performance improvement cannot be achieved depending on the passage rate, and also in that the performance varies significantly depending on the type of input image and the processing position within the input image.

The performance degradation and performance variation are caused by a situation in which when the average accumulated passage rate in a stage decreases due to a variation, data supply to the subsequent stage is interrupted, as a result of which the discriminators mounted for the subsequent stage do not operate. The situation in which the discriminators do not operate will be described in detail, taking the case in which the images of FIGS. 14A and 14B are processed with a configuration in which 4 pipelines, each having 3 stages, are mounted using 12 discriminators. FIGS. 17A to 17H are schematic diagrams showing the average operation state of the discriminators when the identification processing is performed on Band_A, Band_B, Band_C, Band_D, Band_X, Band_Y and Band_Z. It should be noted that the following description assumes that the processing time is the same in all of the discriminators.

In FIGS. 17A to 17H, non-hatched circles indicate discriminators (modules) that are constantly operated, and hatched circles indicate modules that are operated or shut down depending on the processing result in the preceding stage. Also, cross-hatched circles indicate modules that are constantly shut down. If the average accumulated passage rate $P[N]$ of the identification processing in the stage N is determined for each band from the above-mentioned graph shown in FIG. 14C, in Band_A, $P[1]=10\%$ and $P[2]=2\%$ are obtained. Accordingly, 4 discriminators are constantly operated in the stage 0, but 3 discriminators are constantly shut down in each of the stage 1 and the stage 2, with the only discriminator in operation in the stage 1 having an operating ratio of 40% and the only discriminator in operation in the stage 2 having an operating ratio of 0.8%. Therefore, in Band_A, it is only possible to acquire performance approximately 4.5 (=4+0.4+0.08) times greater. On the other hand, in Band_D, high average accumulated passage rates are obtained with $P[1]=92\%$ and $P[2]=90\%$, and therefore in both the stage 1 and the stage 2, almost all of the discriminators are constantly operated. As a result, the processing speed can be increased by approximately 11.3 (=4+4×0.92+4×0.9) times, close to the target performance. However, the average accumulated passage rate of the entire image of FIG. 14A is $P[1]=50\%, p[2]=40\%$, and therefore the processing speed can be increased only by approximately 7.6 (=4+4×0.5+4×0.4) times.

When each band is analyzed in the manner described above, in Band_D of FIG. 14A, because the average accumulated passage rate in each stage is high, the performance is improved by approximately 11.3 times, which is close to the target value of 12 times. However, the performance is improved by only approximately 8.4 times in Band_C, by only approximately 5.8 in Band_B, and by only approximately 4.5 times in Band_A. Consequently, in the entire image, the performance is improved by only approximately 7.5 times. Likewise, in the image shown in FIG. 14B, in Band_X, the performance is improved by only approximately 4.5 times (the same as Band_A of FIG. 14A), by only approximately 4.9 times in Band_Y, and by only approximately 6.8 times in Band_Z, and in the entire image, the performance is improved by only 4.7 times, which is even lower than FIG. 14A.

The above description was given assuming that the processing time was the same in all of the discriminators, but in practice, each stage has a different processing load. For this reason, there is a possibility that rate-limiting of processing might occur (the longest of the processing times of the stages might rate-limit the overall processing time) in the temporally parallel processing described earlier, and this may cause a further performance degradation.

The identification processing of desciminators for each stage are defined by feature amount used for the identification. Therefore, if feature amounts and connection relationship among the desciminators can be changed, assignment of desciminators to each stage can be adjusted to disperse loads. Conventionally, various dynamic load balancing methods have been proposed in order to improve and stabilize the processing performance by making the operation ratios of the processors uniform. For example, Japanese Patent Laid-Open No. 2003-256221 (hereinafter referred to as Document 2) presents the following proposal. Specifically, processes generated by parallel programs are assigned to processing timeslots of a plurality of processors according to the time corresponding to the processor distribution ratio preset for each parallel program. It is then determined whether a plurality of parallel processes generated by a parallel program can be assigned to idle timeslots, to which no process has been assigned, of the processing times of the processors so as to be capable of parallel operation. If parallel operation is possible, other parallel processes are additionally assigned to the idle timeslots, and the processors execute the parallel processes assigned to the processing timeslots of the processors.

However, according to the technique of Document 2, processes that require a turn-around time guarantee are assigned to predetermined timeslots, and a plurality of parallel processes capable of parallel operation are additionally assigned to idle timeslots, whereby the operating ratios of the processors are improved while the turn-around time is guaranteed. However, Document 2 only gives consideration to the case where processes having predetermined loads are processed. In other words, none of the conventional technology performs control focusing on the passage rate and processing time of each stage. Accordingly, the data processing (so-called cascade processing) controlling a plurality of processes, in which whether or not to execute the next processing is determined based on a processing result, such as the face detection according to the Viola & Jones method, is disadvantageous in that, when the load (execution time) of processing (process) varies depending on the input data, the effect of suppressing the performance degradation and the performance variation is small.

SUMMARY OF THE INVENTION

According to one aspect of the present invention, a data processing apparatus and a data processing method are provided that have little performance variation depending on the type of input image and the processing position within an image, as well as uniform and high processing performance.

According to one aspect of the present invention there is provided a data processing apparatus for using a plurality of processing modules to sequentially execute data processing on a plurality of partial data of input data through a plurality of stages, wherein, in the data processing, it is determined, depending on a processing result in a preceding stage on data, whether or not to execute processing on the data in a subsequent stage, the apparatus comprising: a connecting unit configured to distribute the plurality of processing modules over the plurality of stages, and to connect the plurality of processing modules such that a plurality of partial data pieces are processed in parallel; a detecting unit configured to, with respect to at least a part of the plurality of stages, detect a ratio of an amount of data for which processing in the subsequent stage has been executed to an input data amount, as a passage rate; a determining unit configured to acquire a data amount to be processed in each stage to which passage rate is detected, based on the passage rate detected by the detecting unit, and to determine the number of processing modules to be distributed to each stage based on the acquired data amount; and a changing unit configured to change a connection pattern of the plurality of processing modules connected by the connecting unit according to the distribution determined by the determining unit.

According to another aspect of the present invention there is provided a data processing method in a data processing apparatus for using a plurality of processing modules to sequentially execute data processing on a plurality of partial data of input data through a plurality of stages, wherein, in the data processing, it is determined, depending on a processing result in a preceding stage on data, whether or not to execute processing on the data in a subsequent stage, the method comprising the steps of: distributing the plurality of processing modules over the plurality of stages, and connecting the plurality of processing modules such that a plurality of partial data pieces are processed in parallel; detecting, with respect to at least a part of the plurality of stages, a ratio of an amount of data for which processing in the subsequent stage has been executed to an input data amount, as a passage rate; acquiring a data amount to be processed in each stage to which passage rate is detected, based on the passage rate detected in the detecting step, and to determine the number of processing modules to be distributed to each stage base on the acquired data amount; and changing a connection pattern of the plurality of processing modules connected in the connecting step according to the distribution determined in the determining step.

Further features of the present invention will become apparent from the following description of exemplary embodiments with reference to the attached drawings.

BRIEF DESCRIPTION OF THE DRAWINGS

FIGS. 4A to 4D are diagrams showing the accumulated passage rate for each stage and examples of module assignment.

FIG. 5 is a diagram showing an example of detecting the passage rate.

FIGS. 8A and 8B are diagrams illustrating a procedure for determining a connection configuration of discriminators.

FIGS. 9A and 9B are diagrams illustrating a procedure for determining a connection configuration of discriminators.

FIGS. 11A to 11C are diagrams illustrating a module configuration change performed on the example of passage rate detection shown in FIG. 10.

FIGS. 12A and 12B are diagrams illustrating an example in which the module configuration changing unit is implemented with a network (interconnect).

FIG. 15A shows examples of feature amounts for use in face recognition.

FIGS. 15B to 15E are diagrams showing example face detection results.

FIGS. 17A to 17H are diagrams illustrating how the discriminator operating ratio changes due to passage rate variations.

DESCRIPTION OF THE EMBODIMENTS

Hereinafter, preferred embodiments of the present invention will be described with reference to the accompanying drawings.

Figure 1:
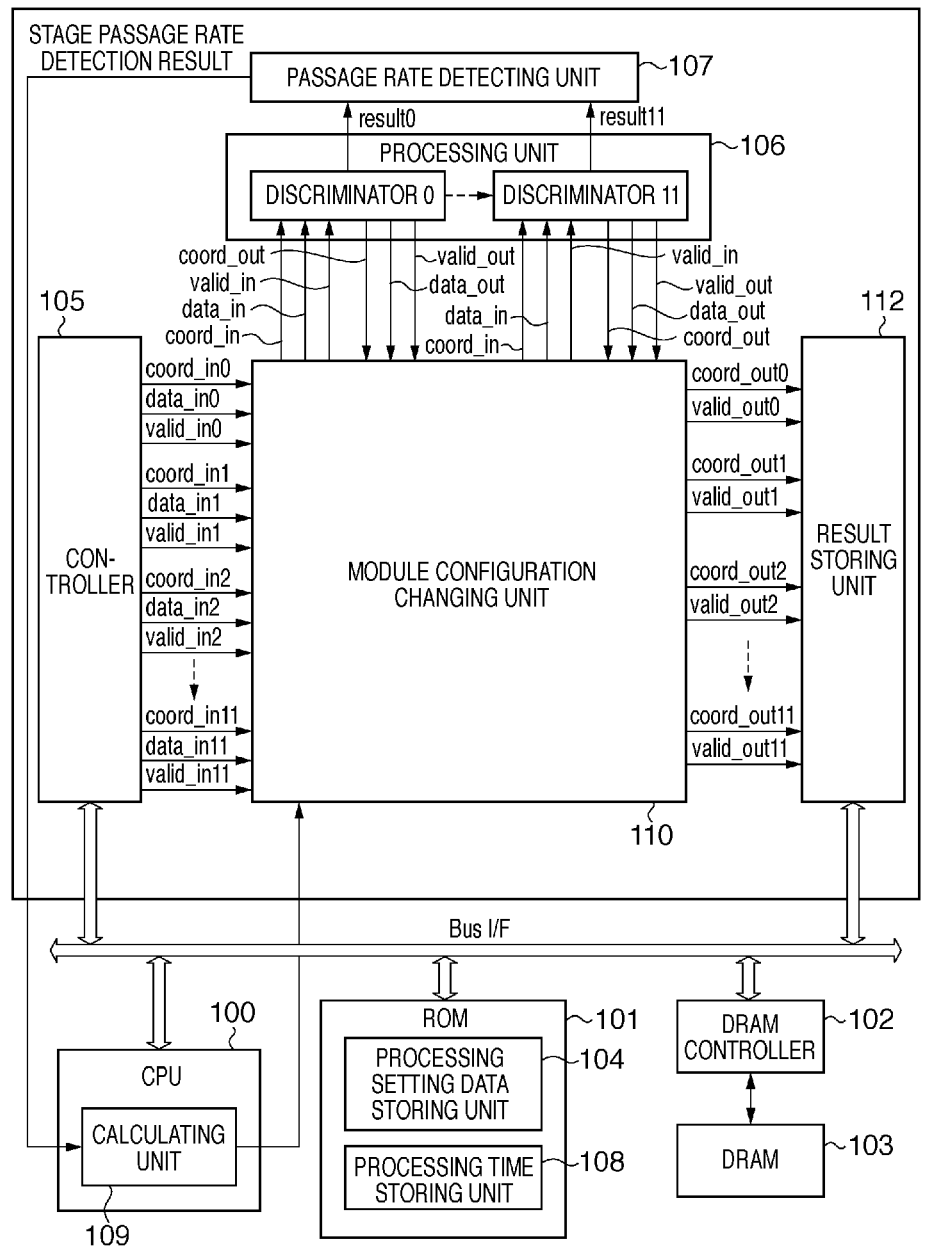
FIG. 1 is a block diagram showing an example configuration of a data processing apparatus according to an embodiment of the present invention.

FIG. 1 is a block diagram showing an example of an overall configuration of a data processing apparatus according to an embodiment of the present invention. The data processing apparatus according to the present embodiment executes data processing composed of a predetermined number of two or more stages by using a plurality of processing modules. The processing modules are assigned to these stages. Partial data (e.g. data pieces or portions) sequentially extracted from input data is processed, and whether or not to process the partial data in a subsequent stage is determined according to the processing result of a preceding stage. In the following description, image data is used as the input data, and discriminators for performing pattern identification using the image data are used as processing modules, but the input data and the processing modules are not limited thereto. Application to, for example, pattern recognition regarding DNA base sequence information or pattern recognition regarding audio signals is also possible.

A CPU 100 performs overall control of the data processing apparatus by executing various programs stored in a ROM 101, which is a read-only memory. A DRAM 103 stores image data to be processed. The image data stored in the DRAM 103 is supplied to a controller 105 via a DRAM controller 102. A processing unit 106 includes 12 discriminators 0 to 11 for performing pattern identification. A module configuration changing unit 110 distributes the discriminators 0 to 11 to a predetermined number of stages, respectively, and connects the discriminators such that a plurality of partial data pieces are processed in parallel over a predetermined number of stages and within at least one stage, details of which will be described later with reference to FIGS. 2 and 3.

When the identification processing is started, the CPU 100 acquires setting data as typified by, for example, feature amounts (e.g. image condition) from a processing setting data storing unit 104 included in the ROM 101, and sets the data in the discriminators inside the processing unit 106. More specifically, in each discriminator, a feature amount corresponding to the stage to which the discriminator belongs is set (for example, the feature amount 210 shown in FIG. 15A is set in the discriminators belonging to the stage 0, and the feature amount 211 is set in the discriminators belonging to the stage 1). Also, the CPU 100 acquires setting data as typified by, for example, image data positions (addresses) from the processing setting data storing unit 104, and sets the data in the controller 105. Furthermore, in this initial state, the CPU 100 initializes the module configuration changing unit 110. The module configuration changing unit 110 sets connections of the discriminators 0 to 11 in the initial state such that 4 pipeline configurations, each having 3 stages, are connected in parallel, which will be described later with reference to FIGS. 2 and 3.

Figure 14A:
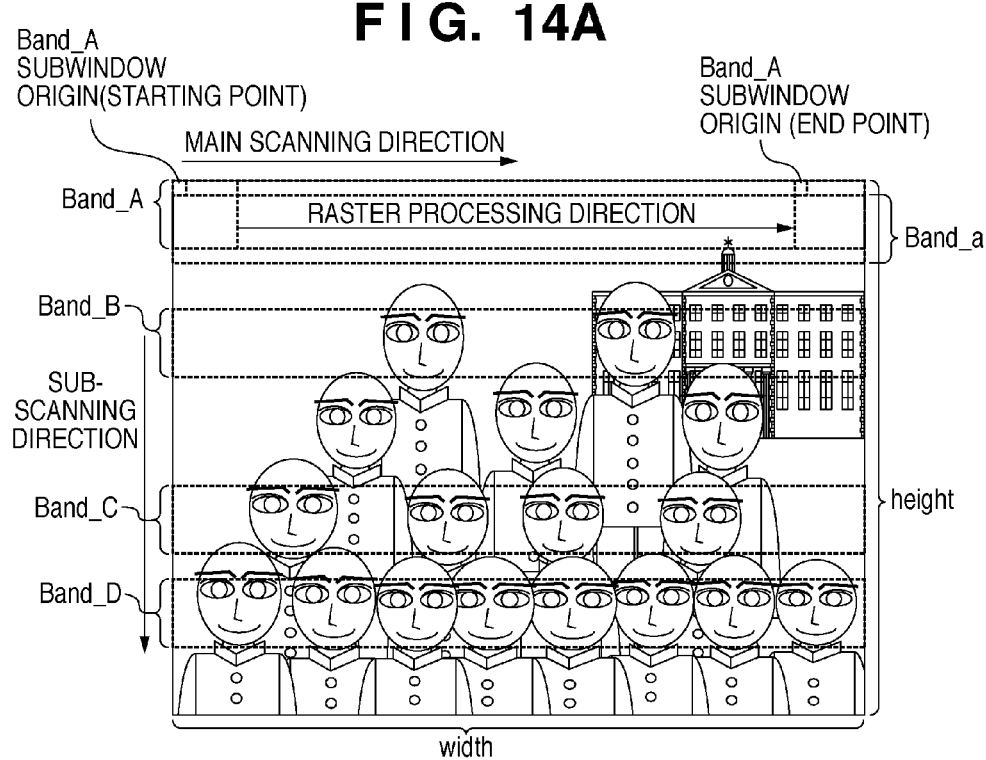
FIGS. 14A and 14B are diagrams showing example images on which face detection is performed.
Figure 14B:
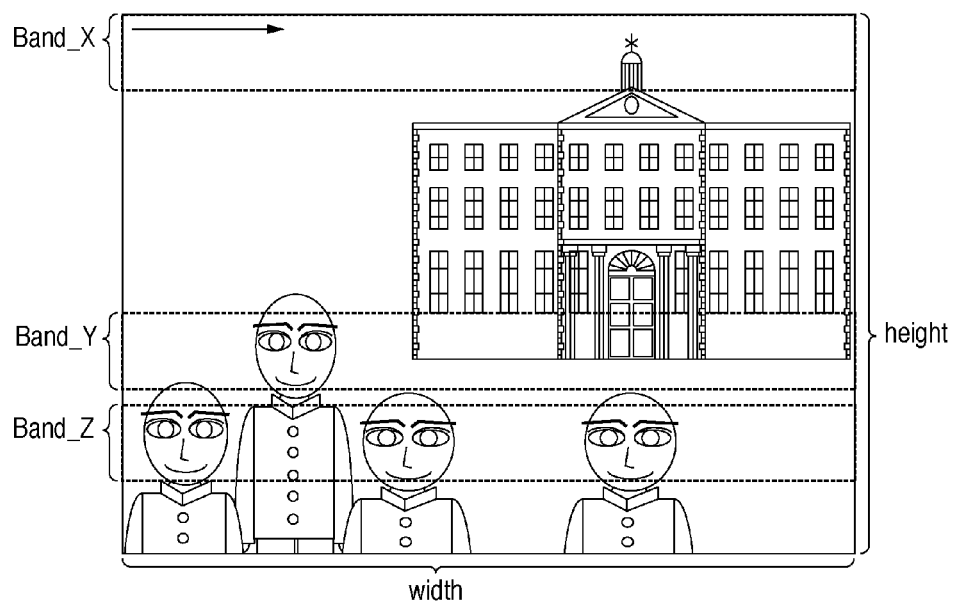
Figure 14C:
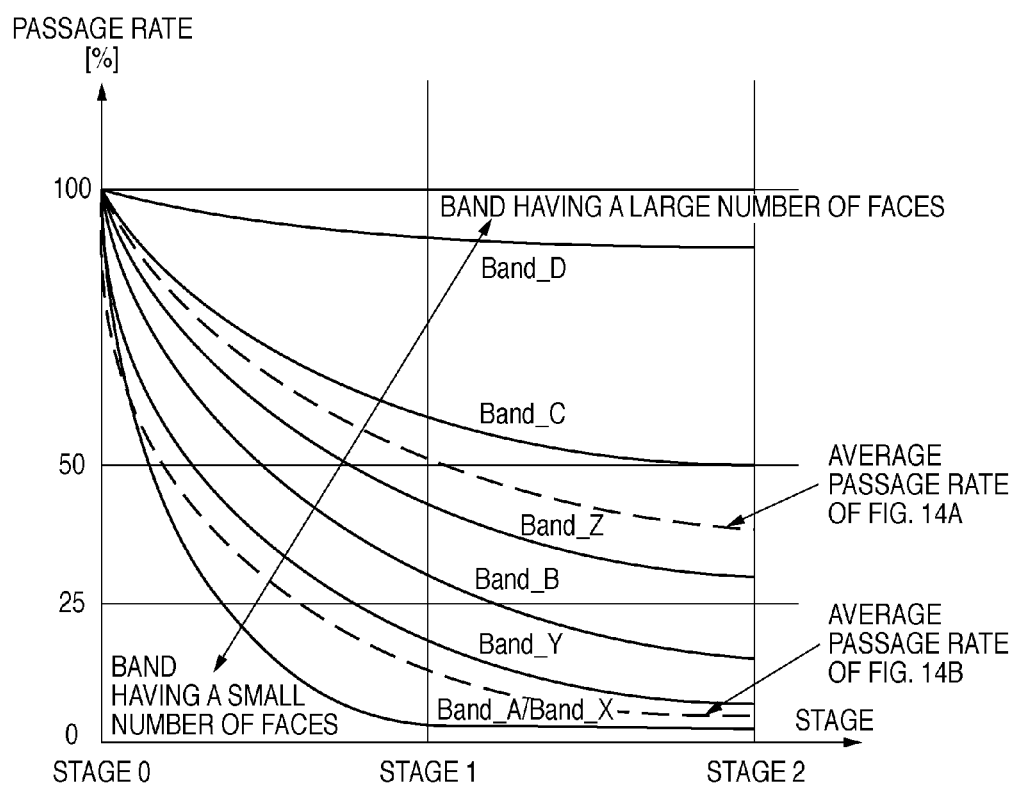
FIG. 14C is a diagram showing passage rates of bands in the images.
Figure 16A:
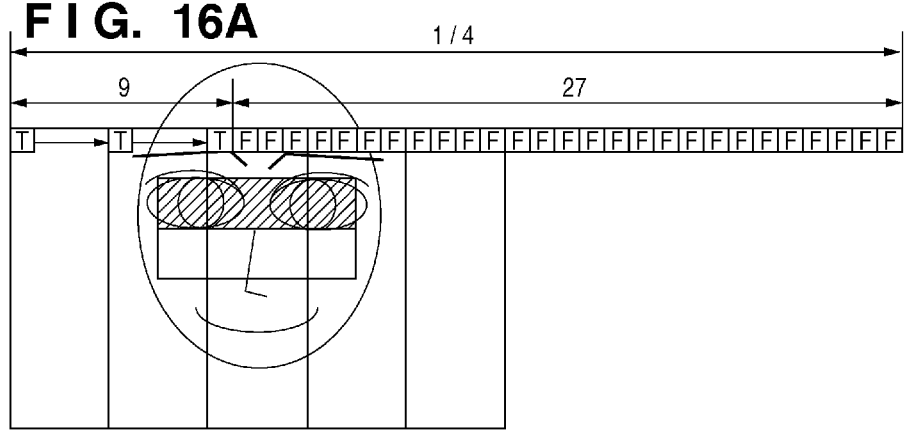
FIGS. 16A to 16C are diagrams illustrating passage rate variation due to different face densities in the image.
Figure 16B:
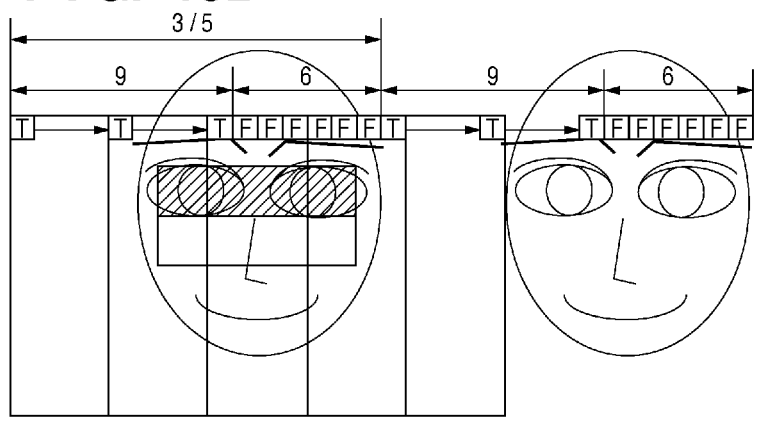
Figure 16C:
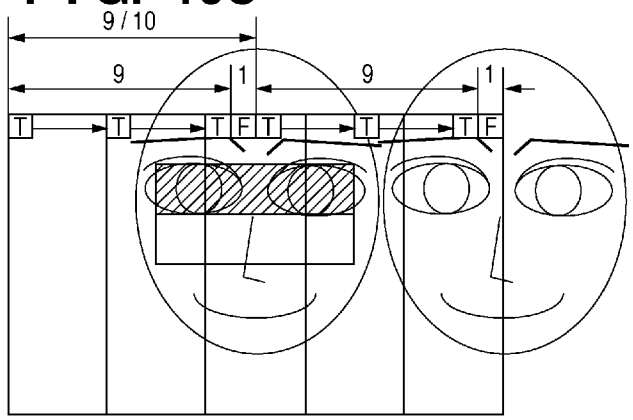

When setting in the controller 105, the processing unit 106 and the module configuration changing unit 110 is finished, the CPU 100 sends a notification to start processing to the controller 105 and the processing unit 106. The controller 105 sequentially reads rectangular region data from the image data stored in the DRAM 103 by accessing the DRAM controller 102 based on the set image data positions (addresses), and transfers the data to the processing unit 106. The rectangular regions have been described above with reference to FIG. 14A. The processing unit 106 sequentially executes identification processing on the rectangular region image data that has been transferred. The processing results are stored in a result storing unit 112. The CPU 100 can obtain coordinate values of the rectangular regions determined to be a face in the image data by reading the results.

Figure 2:
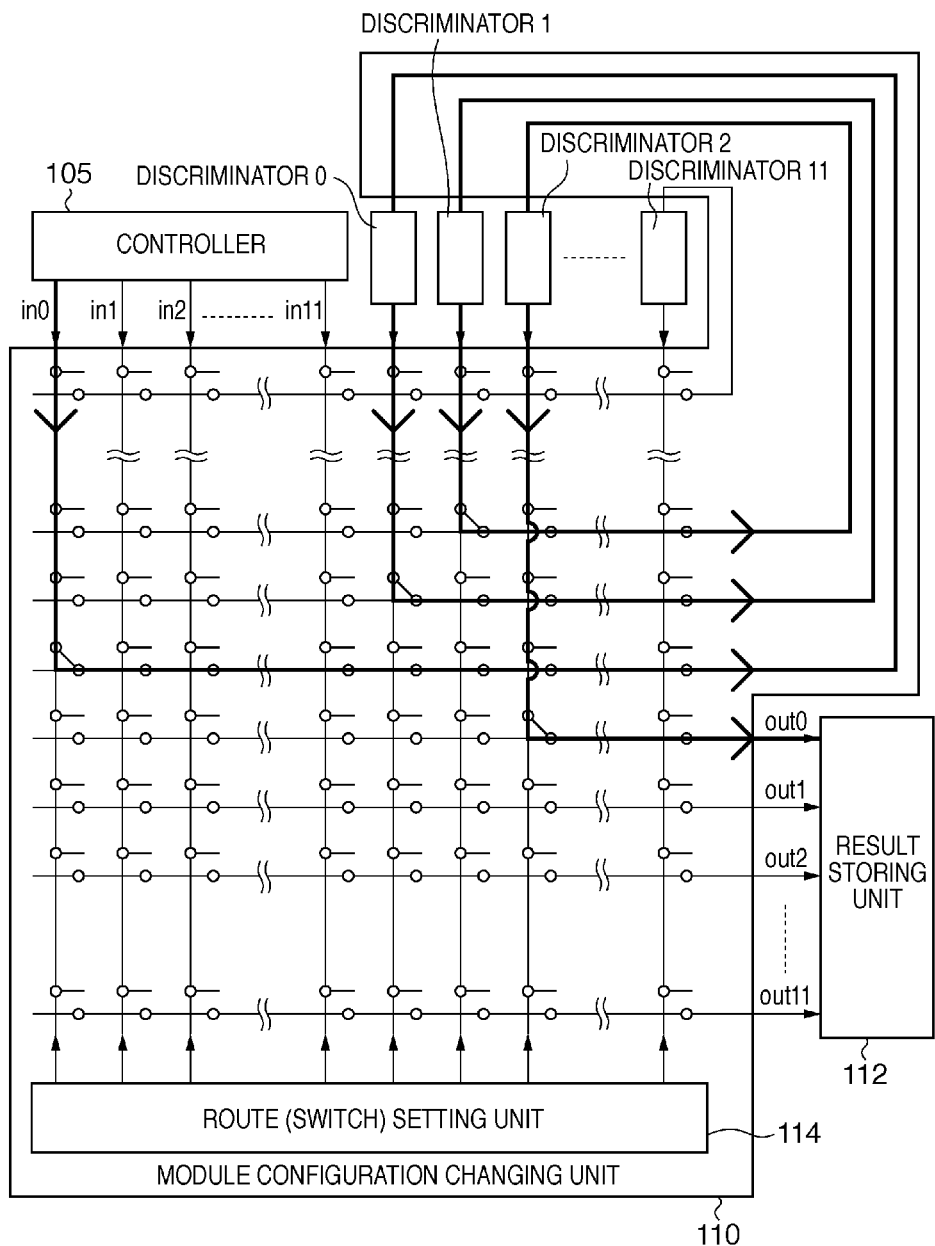
FIG. 2 is a diagram showing an example configuration of a module configuration changing unit according to the embodiment of the present invention.
Figure 3:
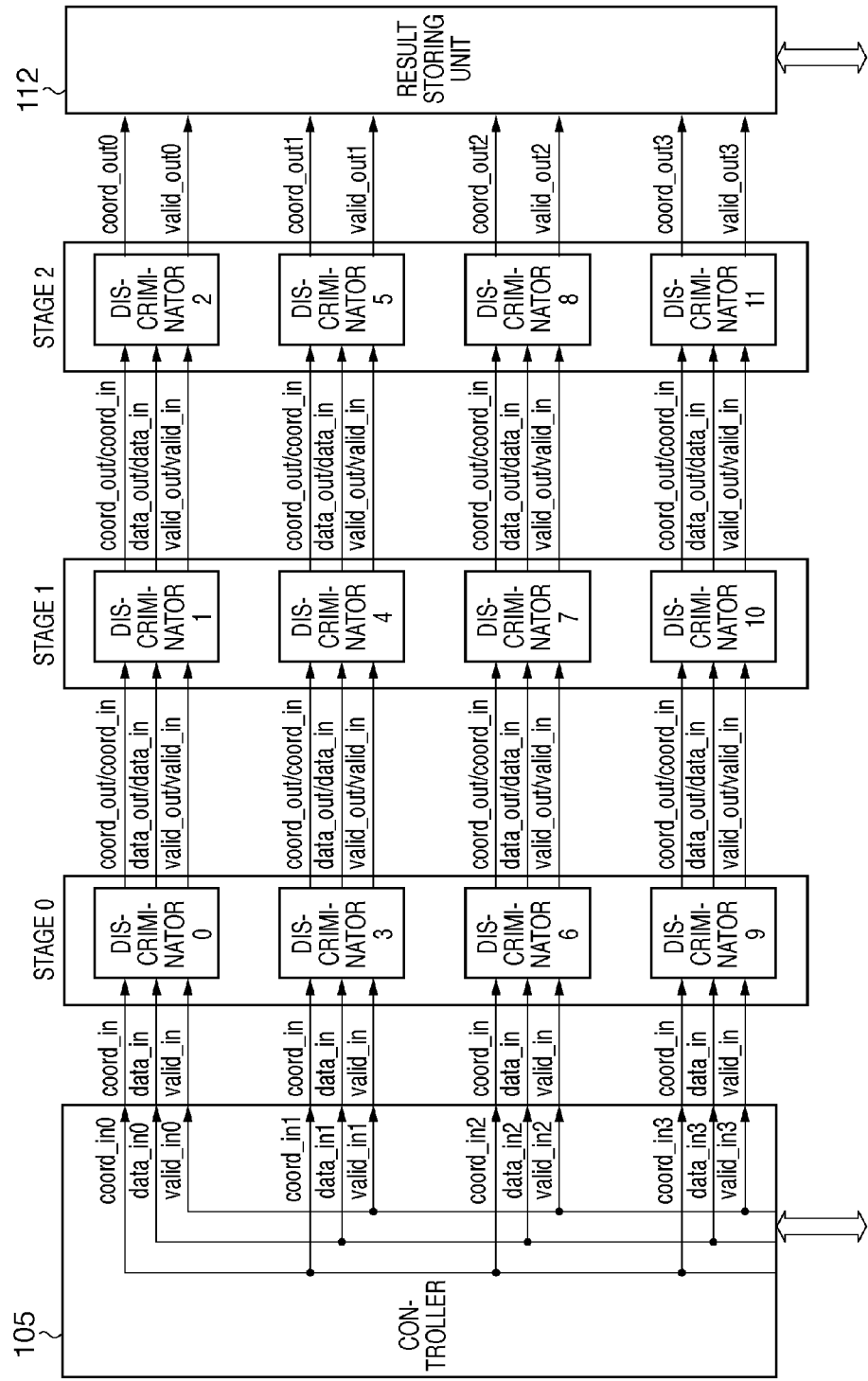
FIG. 3 is a diagram showing an example of a connection that temporally/spatially parallelizes processing with a plurality of discriminators.

FIG. 3 is a diagram showing a connection pattern (initial state) of the discriminators in the case where the discriminators 0 to 11 are connected by the module configuration changing unit 110 such that 4 pipeline configurations, each having 3 stages, are connected in parallel. The connections of the discriminators can be changed as shown in FIG. 2 by the module configuration changing unit 110 switching the connections. In FIG. 2, the discriminator 0 is connected to the controller 105, and the discriminator 0, the discriminator 1, and the discriminator 2 are connected in the stated order, and thereafter the output of the discriminator 2 is supplied to the result storing unit 112.

A description will be given of rectangular region image data piece that is a part of an input image (input data piece 0: data_in0) being input from the controller 105 to the discriminator 0. A valid signal as used herein refers to a control signal for controlling whether data_in is valid. Valid_out=1 is output if True is determined by the discriminator 0, and valid_out=0 is output if False is determined by the discriminator 0.

The controller 105 detects that valid data (data_in0) has been input upon detecting an assertion (valid_in0=1) of a control signal. Then, the controller 105 outputs the valid data (data_in0) to data_in of the discriminator 0, and outputs "1" to valid_in of the discriminator 0 in order to indicate that the input data is valid. Upon detecting valid_in=1, the discriminator 0 performs identification processing based on the input data (data_in), and outputs an identification result (valid_out). The result output by the discriminator 0 will be an input signal valid_in that is input to the discriminator 1. If True is identified by the discriminator 0, the input data is output to data_in of the next discriminator 1, and "1" indicating that the input data is valid is output to valid_in of the discriminator 1, whereby the discriminator 1 can detect and process valid input data. In the manner described above, input data is passed using data lines, and whether valid data has been input (whether to perform processing) is controlled with valid lines. If all of the identification results from the discriminators 0 to 2 are True, valid_out=1 is output from the discriminator 2, and thereby it is determined that the input data piece 0 (data_in0) includes a face. With the configuration described above, in the case where the discriminators distributed over the 3 stages can operate in parallel completely simultaneously, the processing speed can be increased by up to 3 times compared to the configuration including one discriminator.

In FIG. 3, in order to further increase the processing speed of the temporally parallel processing described above, the discriminators are connected so as to perform spatially parallel processing. Specifically, 4 pipeline configurations, each executing processing over the 3 stages, are connected in parallel with the aim of achieving a processing speed 12 times faster in total. Accordingly, in the configuration shown in FIG. 3, coordinate data (coord_in) that indicates the coordinate position of a rectangular region is used in order to determine to which coordinates of rectangular region a processing result belongs so as to perform spatially parallel processing. When data_in and valid_in are input to the controller 105, data_in0, data_in1, data_in2, and data_in3 are input in turn to the 4 discriminators 0, 3, 6 and 9 mounted for the stage 0.

Then, after spatially parallel processing has been performed, coord_out0, coord_out1, coord_out2, and coord_out3 are input to the result storing unit 112 from the 4 discriminators 2, 5, 8 and 11 mounted for the stage 2. In other words, the number of discriminators mounted for the stage 0 is quadrupled, and it is therefore possible to simultaneously process 4 different rectangular region data pieces (data_in0, data_in1, data_in2, and data_in3). Accordingly, in the case where 12 discriminators can be operated in parallel completely simultaneously, the processing speed can be increased by up to 12 times compared to the configuration including one discriminator. In FIG. 2, each of the signal lines (input signals in and output signals out) is a representation of 3 types of input/output signals (coordinate data (coord_in/out), image data (data_in/out) and control signal (valid_in/out)) shown in FIG. 1 bundled into a single line.

Reverting to FIG. 1, the data processing apparatus of the present embodiment further includes a passage rate detecting unit 107, a processing time storing unit 108 and a calculating unit 109. Also, the connections between discriminators are changed via (by) the module configuration changing unit 110 depending on the results of calculation by the calculating unit 109.

The passage rate detecting unit 107 detects (determines) the passage rate (the ratio of the processing result that causes the subsequent stage to execute processing) of each stage upon receiving an input of the identification result signal (result signal, the same as the valid lines in the present embodiment) that is output from each discriminator. The calculating unit 109 (calculation program executed by the CPU 100) calculates a module configuration by using the passage rate of each stage (discriminators) detected by the passage rate detecting unit 107 and the discriminator processing time of each stage stored in the processing time storing unit 108.

The module configuration changing unit 110 changes the module configuration based on the configuration information calculated by the calculating unit 109. The module configuration changing unit 110 is composed of a crossbar switch such that all of the connections of the input signals (in0 to in11) from the controller 105, the output signals (out0 to out11) to the result storing unit and the input/output signals of the discriminators 0 to 11 can be set. Connections between input and output are established by connecting (ON) at most one switch from among a plurality of horizontally disposed switches. The opening and closing (ON/OFF) of the switches are controlled by a route (switch) setting unit 114 (see FIG. 2).

Next, a method for calculating a module configuration using the passage rate of each stage detected by the passage rate detecting unit 107 and the processing time of each stage stored in the processing time storing unit 108 performed by the calculating unit 109 will be described. Hereinafter, the method will be described in detail using the passage rates detected at a particular time and the processing times shown in FIGS. 4A to 4D (hereinafter referred to as Examples 1 to 4).

The processing time per discriminator mounted for the stage N is defined as Tm[N], and the accumulated passage rate in the stage N is defined as P[N]. In this case, the average processing time Td[N] required for one discriminator per input data (rectangular image data) in the stage N can be given by the following Equation (1):

$$Td[N]=Tm[N]*P[N] \qquad (1).$$

Because Td[N] is the average processing time per discriminator, if a plurality of discriminators (modules) capable of processing the same stage are mounted, the processing of the stage can be shared. Accordingly, if the number of discriminators (modules) mounted for the stage N is defined as Num[N], the processing time T[N] per input data (rectangular image data) in the stage N can be given by the following Equation (2):

$$T[N]=Td[N]/Num[N]=(Tm[N]*P[N])/Num[N] \qquad (2).$$

As described earlier, in order to optimize the efficiency of the temporally parallel processing, it is desirable that the stages have a uniform processing time. In other words, by determining Num[N] such that T[N] is uniform in all of the stages, it is possible to calculate the optimal number of discriminators that should be mounted for each stage. Hereinafter, a description will be given of a method for calculating the optimal number of discriminators that should be mounted for the stage 0, 1 or 2 (Num[0], Num[1] or Num[2]) based on the processing time Tm per discriminator and information regarding the accumulated passage rate P in each stage shown in Example 1 of FIG. 4A, performed by the calculating unit 109.

In order to make the processing time uniform over all of the stages, it is only necessary to determine the number of discriminators distributed for each stage (Num[0], Num[1] or Num[2]) so as to satisfy:

$$(Tm[0]*P[0])/Num[0]=(Tm[1]*P[1])/Num[1]=(Tm[2]*P[2])/Num[2] \qquad (3).$$

That is, the number of discriminators distributed for each stage is determined from the processing time of each stage and the data amount processed in each stage that is determined using the accumulated passage rate, such that the processing time is uniform over the stages. Substituting the processing time Tm per discriminator and the accumulated passage rate P of Example 1 into Equation (3) yields $$(1*1)/Num[0]=(1*1/2)/Num[1]=(1*(1/2*1/2))/Num[2], \text{ and then yields}$$

$$Num[0]:Num[1]:Num[2]=4:2:1 \qquad (4).$$

Accordingly, by configuring each stage such that the number of discriminators (processing modules) for each stage satisfies the ratio of Equation (4) by using the passage rate detected by the passage rate detecting unit 107, it is possible to achieve an optimal circuit configuration in which the number of modules that are shut down is small. Examples 2, 3 and 4 also show examples in which the ratio of the number of modules among the stages is calculated in the same manner.

The above calculation can be implemented by the CPU 100:

reading the processing time per discriminator stored in the processing time storing unit 108;

calculating the accumulated passage rate from the passage rate detected by the passage rate detecting unit 107; and executing the calculation program (the calculating unit 109) for determining the ratio of the number of discriminators of Equation (4) by computing each term of Equation (3) or the like.

Next, the effect of improving and stabilizing the performance obtained when the module configuration change according to the present embodiment is carried out will be described with reference to FIG. 5, FIGS. 6A to 6D and FIGS. 7A to 7D. In order to facilitate the description of the relationship between passage rate variation and performance, it is assumed that all of the discriminators have the same processing time (Tm[0]=Tm[1]=Tm[2]=1) as shown in Example 1. It is also assumed that passage rates shown in Examples (1) to (3) of FIG. 5 have been detected by the passage rate detecting unit 107.

Figure 6A:
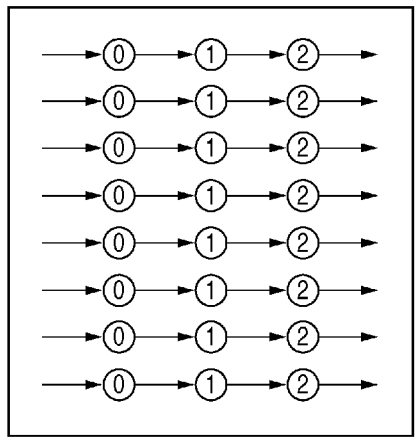
FIGS. 6A to 6D are diagrams illustrating the operation state of each of 24 discriminators.

In the following, it is assumed that the processing unit 106 includes 24 discriminators, and eight 3-stage pipeline configurations can be connected in parallel. FIGS. 6A to 6D show a conventional example in which the module configuration is not changed. FIGS. 7A to 7D show an example of the present embodiment in which the module configuration is changed. FIGS. 6A and 7A show simplified diagrams showing the initial state of the module configuration. In the initial state, 8 discriminators are mounted for each of 3 stages, with a degree of temporal parallelism of 3 and a degree of spatial parallelism of 8. The total number of discriminators is 24. This aims to improve the performance by up to 24 times relative to the configuration including one discriminator.

Figure 7A:
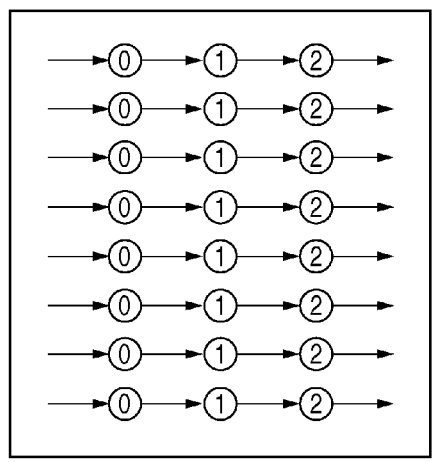
FIGS. 7A to 7D are diagrams showing how the connection pattern of 24 discriminators is changed according to the passage rate.
Figure 7B:
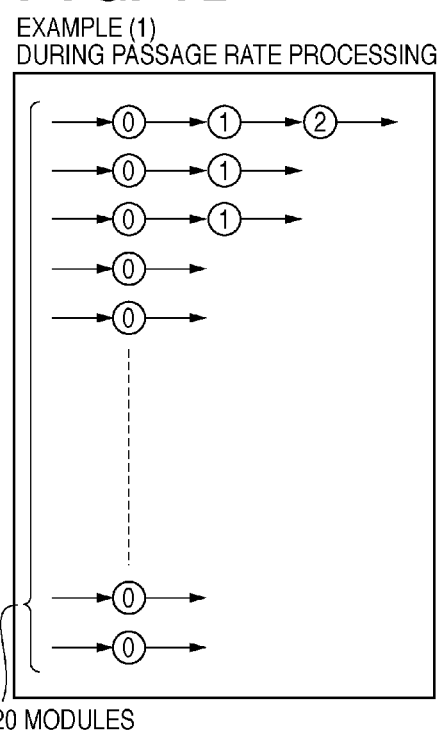

It is assumed that after operation is started, the passage rates $p[0]=3/20$ and $p[1]=1/3$, and the accumulated passage rates $P[1]=3/20$ and $P[2]=1/20$ of the stages 0 and 1 shown in Example (1) are detected by the passage rate detecting unit 107. Here, all of the discriminators are assumed to have the same processing time ($Tm[0]=Tm[1]=Tm[2]=1$). Accordingly, the ratio of the number of modules that satisfies Equation (3) is calculated to be $Num[0]:Num[1]:Num[2]=20:3:1$ using the accumulated passage rates $P[1]=3/20$ and $P[2]=1/20$. The calculating unit 109 instructs the module configuration changing unit 110 to satisfy the ratio of the number of modules calculated in this manner. As a result, the module configuration changing unit 110 changes the configuration (the number of modules assigned for each stage) as shown in FIG. 7B, or in other words, such that $Num[0]=20$, $Num[1]=3$ and $Num[2]=1$ are satisfied. In this case, all of the discriminators are constantly operated, and thus the performance can be improved by 24 times that of the configuration including one discriminator.

Figure 6B:
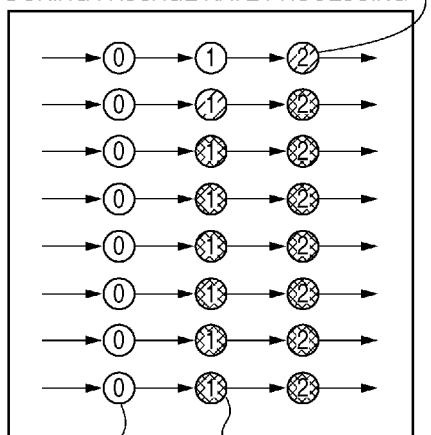

On the other hand, in the configuration according to the conventional technology, in the case of the passage rates shown in Example (1), as shown in FIG. 6B, seven out of the discriminators mounted for the stage 2 are constantly shut down, and the remaining one is either operated or shut down depending on the results of the stages 0 and 1. As in FIGS. 17A to 17H, discriminators that are constantly operated are indicated by non-hatched circles, modules that are operated or shut down depending on the result in the preceding stage are indicated by hatched circles, and modules that are constantly shut down are indicated by cross-hatched circles. Because the accumulated passage rates are $P[1]=3/20$ and $P[2]=1/20$, the processing performance in this case will be approximately 9.6 ($=8+8\times3/20+8\times1/20$) times that of the configuration including one discriminator, providing only 40% of the performance of the present embodiment.

Figure 7C:
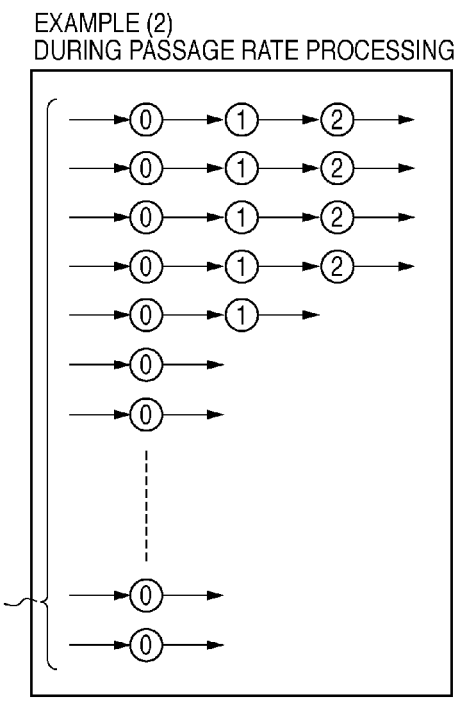

It is assumed that the passage rate further varies, and the passage rates shown in Example (2) (the passage rates $p[0]=1/3$ and $p[1]=4/5$, and the accumulated passage rates $P[1]=1/3$ and $P[2]=4/15$ of the stages 0 and 1) are detected by the passage rate detecting unit 107. In this case, the ratio of the number of modules that satisfies Equation (3) is calculated to be $Num[0]:Num[1]:Num[2]=15:5:4$, and as shown in FIG. 7C, the configuration is changed such that $Num[0]=15$, $Num[1]=5$ and $Num[2]=4$ are satisfied. In this case as well, all of the discriminators are constantly operated as in Example (1), and therefore the performance can be improved by 24 times that of the configuration including one discriminator, without causing a performance variation due to the passage rate variation.

Figure 6C:
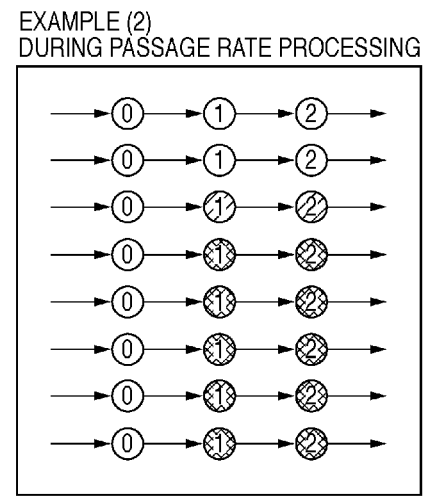

On the other hand, in the configuration according to the conventional technology, as shown in FIG. 6C, a large number of discriminators are shut down as in the case of the passage rates of Example (1). Because the accumulated passage rates are $P[1]=1/3$ and $P[2]=4/15$, the processing performance will be approximately 12.8 ($=8+8\times1/3+8\times4/15$) times that of the configuration including one discriminator, providing only about 50% of the performance of the present embodiment.

Figure 7D:
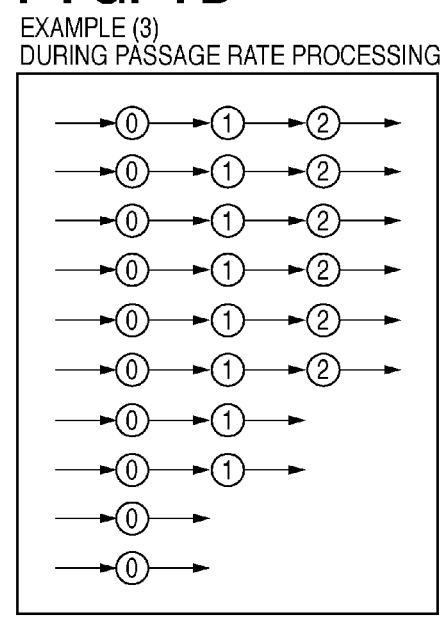

It is assumed that the passage rate further varies, and the passage rates shown in Example (3) (the passage rates $p[0]=4/5$ and $p[1]=3/4$, and the accumulated passage rates $P[1]=4/5$ and $P[2]=3/5$ of the stages 0 and 1) are detected. In this case, the ratio of the number of modules that satisfies Equation (3) is calculated to be $Num[0]:Num[1]:Num[2]=5:4:3$, and as shown in FIG. 7D, the configuration is changed such that $Num[0]=10$, $Num[1]=8$ and $Num[2]=6$ are satisfied. As in Examples (1) and (2), the performance can be improved by 24 times that of the configuration including one discriminator, still providing a high level of performance.

Figure 6D:
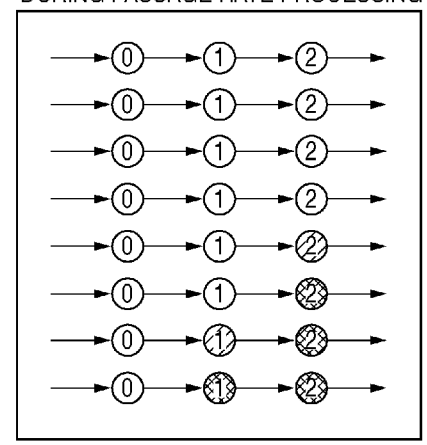

On the other hand, in the configuration according to the conventional technology, as shown in FIG. 6D, not all of the discriminators are constantly operated even in Example (3) in which the passage rates are relatively high. In this case, because the accumulated passage rates are $P[1]=4/5$ and $P[2]=3/5$, the processing performance will be approximately 19.2 ($=8+8\times4/5+8\times3/5$) times that of the configuration including one discriminator, providing 80% of the performance of the present embodiment.

As described above, according to the conventional technology, when the average accumulated passage rate of a stage decreases, the data supply to the subsequent stage is interrupted, causing a situation in which the discriminators mounted for the subsequent stage are not operated, and causing performance degradation. Also, when the average accumulated passage rate varies, the number of non-operational discriminators varies, causing performance variation. In contrast, according to the present embodiment, even when the average accumulated passage rate decreases or varies, the number of non-operational discriminators can be always minimized, and thus a high level of performance that is constantly stable can be acquired.

In order to clarify the effects of the present invention, the foregoing has been described using the example in which the ratio of the number of modules is an integer ratio. However, generally speaking, the ratio of the number of modules will not always be an integer ratio. Even if the ratio is an integer ratio, there are cases where it is not possible to change the configuration to satisfy the calculated ratio depending on the total number of mounted modules and the like. For example, in Example 1 shown in FIG. 4A, if the total number of mounted modules is 6, the module configuration that satisfies the ratio: 4:2:1 cannot be satisfied. As just described, in the case where the ratio of the number of modules that satisfies Equation (3) is not an integer ratio or where Equation (3) cannot be satisfied by using the total number of mounted modules, the ratio of the number of modules is determined in the following procedure.

To distribute all of the mounted discriminators, there are a plurality of options as to how many discriminators are to be disposed in which stage.

First Procedure

In a first procedure, options to mount at least one discriminator for all of the stages (so configurations including at least one discriminator in each stage) are determined e.g. by selection from among all of the options of how the discriminators could be arranged. This is an appropriate selection criterion because if there is a stage for which no discriminator is mounted, the entire processing will not be complete. Then, in order to determine the best configuration from among the options selected in the first procedure, the following second procedure is applied.

Second Procedure

With respect to an option (e.g. for each configuration selected in the first procedure), the processing time T[N] per input data (rectangular image data) in the stage N is determined for all of the stages using Equation (2), and the highest value thereof is set as a first processing time of the option. As described earlier, in the pipeline processing, because the longest of the processing times of the stages rate-limits the overall processing time, it is appropriate to regard the highest value for the stage processing time (first processing time) as the overall processing time. Then, an option having the smallest value for the first processing time is selected from among all of the options selected in the first procedure, and this is set as the best configuration. If a plurality of options are selected in the second procedure (so if a plurality of configurations have the smallest value for the first processing time), a third procedure is further applied.

Third Procedure

With respect to an option (configuration having the smallest value for the first processing time), the processing time T[N] per input data (rectangular image data) in the stage N is determined for all of the stages using Equation (2), and the second highest value thereof is set as a second processing time of the option. Then, an option having the smallest value for the second processing time is selected from among all of the options selected in the second procedure, and this is set as the best configuration.

If there are a plurality of selected options even after the third procedure has been applied, similar comparisons are made sequentially using the third highest value (third processing time) and the fourth highest value (fourth processing time). When one option having the smallest value for the Nth processing time is left, the selection process is finished. In the case where a plurality of options are left even after similar comparisons are made for all of the stages, a randomly selected option is set as the best configuration.

Hereinafter, specific examples of the above procedures will be described with reference to FIGS. 8A and 8B and FIGS. 9A and 9B. FIGS. 8A and 8B show an example in which the above procedures are applied to Example 1 of FIG. 4A. Specifically, how a module configuration is selected will be described in detail in the case where as a result of calculating the number of modules that should be distributed for each stage by using the conditions of Example 1, Num[0]:Num[1]:Num[2]=4:2:1 is obtained but the number of mounted discriminators is 6.

As options as to how the number of modules is assigned to the stages 0, 1 and 2, as shown in the first procedure, options 1 to 10 to mount at least one discriminator for all of the stages are shown in FIG. 8B. Next, in the second procedure, the best configuration is determined from among the options selected in the first procedure. For this reason, as described above, with respect to an option, the processing time T[N] per input data (rectangular image data) in the stage N is determined for all of the stages using Equation (2), and the highest value is set as a first processing time of the option. FIG. 8A shows calculations for the configurations of the first to fifth options shown in FIG. 8B. An option that has the smallest value for the first processing time is selected from among all of the options selected in the first procedure, and this is set as the best configuration. In FIG. 8B, the second option having a smaller value (1/3) for the highest stage processing time than the other options is selected as the best configuration.

Next, a description will be given of an example in which the third procedure is applied due to a plurality of options being selected in the second procedure, with reference to FIGS. 9A and 9B, taking the same example as in FIGS. 8A and 8B in which 6 discriminators are mounted using the conditions shown in Example 3 shown in FIG. 4C. Specifically, as options as to how the number of modules is assigned to the stages 0, 1 and 2, as shown in the first procedure, options 1 to 10 to mount at least one discriminator for all of the stages are shown in FIG. 9B. FIG. 9A shows calculations for the configurations of the first to sixth options shown in FIG. 9B.

As a result of calculating the number of modules using the conditions of Example 3, Num[0]:Num[1]:Num[2]=2:1:1 is obtained. Next, using the first and second procedures described above, an option whose calculated highest stage processing time is the smallest is selected. In the example shown in FIGS. 9A and 9B, the first to sixth options have the same value of 1/2. Accordingly, in the third procedure, the second highest stage processing times are compared. As a result, in FIG. 9B, it can be seen that the fifth option has 1/4 as the second highest value for the highest stage processing time, which is smaller than the other options. Accordingly, the fifth option is selected as the best configuration. By using the procedures described above, even when the ratio of the number of modules that satisfies Equation (3) is not an integer ratio, the best configuration can be selected.

As described above, the module configuration is changed such that the processing time is uniform over the stages. Also, the module configuration is changed such that the processing time of a stage whose processing time is the longest is shortened. Thus, entire processing time can be reduced.

A procedure for detecting the passage rate performed by the passage rate detecting unit 107 when the input image is sequentially processed will be described next with reference to FIG. 10 and FIGS. 11A to 11C. As an image scanning method, the method described earlier is used in which identification processing is performed pixel by pixel in the main scanning direction of the input image.

First, at the start of processing, the passage rate detecting unit 107 sets the passage rate to a default value (for example, 100%), and sets the module configuration to a default configuration shown in FIG. 11A. When processing starts, the passage rate detecting unit 107 updates the passage rates of the stages based on the identification results of the stages input on a pixel-by-pixel basis. At the time point when a predetermined number of pixels (a rectangular region) have been subjected to identification processing in the main scanning direction, the calculating unit 109 calculates and determines a configuration used to process the next and subsequent pixels in the above-described procedures, based on the passage rates of the stages at that time. So when processing of an update section of a band of the input image has been completed, the calculating unit 109 calculates the passage rates at that time. An update section is defined by a predetermined number of pixels in the main scanning direction and the width of a band in the sub-scanning direction (so corresponds to the area of the input image covered by a predetermined number of rectangular region data pieces extracted sequentially from the input image). Then, the calculating unit 109 instructs the module configuration changing unit 110 to change the configuration based on the calculated values. When the processing reaches the right edge of the image, the passage rate detecting unit 107 resets the passage rates to the above-described default value.

Figure 10:
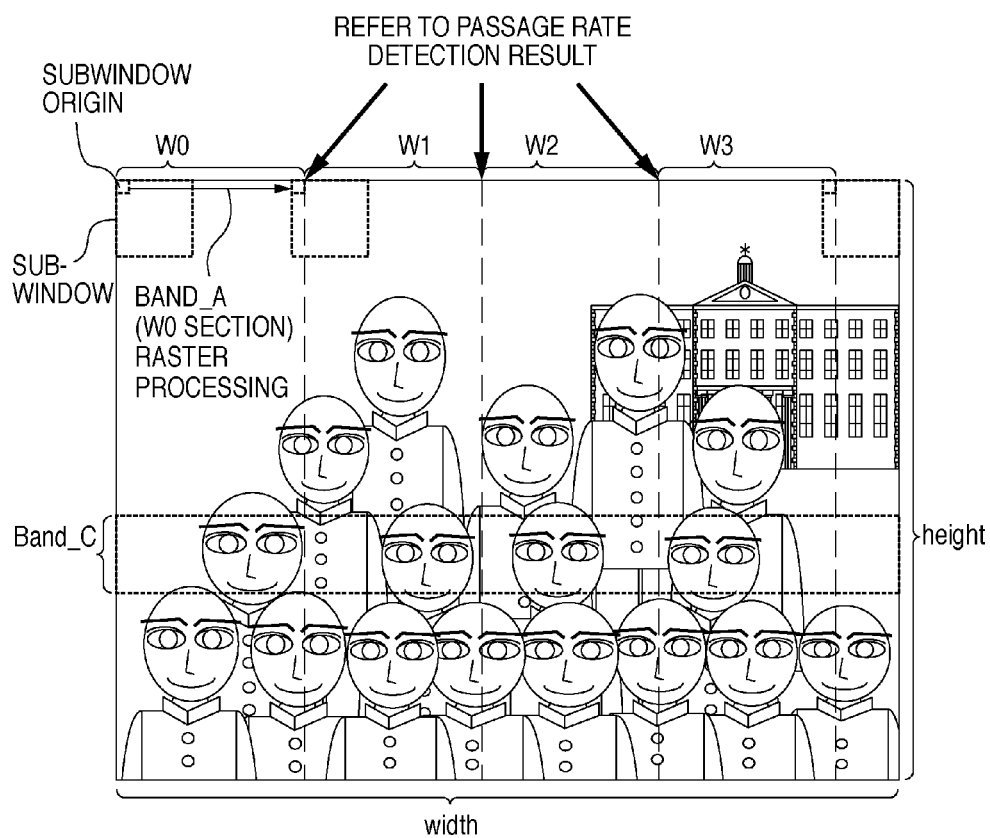
FIG. 10 is a diagram illustrating a process for detecting the passage rate performed by a passage rate detecting unit.

More specific examples of the above procedures will be described with reference to FIG. 10 and FIGS. 11A to 11C. As the predetermined number of pixels in the main scanning direction, W0, W1, W2 and W3 shown in FIG. 10 are used. FIG. 11C shows the average passage rates of the stages 0 and 1 for the W0 section and the W1 section when Band_C of the input image shown in FIG. 10 is processed.

When the processing on Band_C is started, as described earlier, the passage rates shown by the passage rate detecting unit 107 are set to a default value. Accordingly, the configuration when the W0 section (Band_C(W0)) of Band_C is processed is the default configuration shown in FIG. 11A. When the right-edge pixel of Band_C(W0) has been processed, the passage rates output by the passage rate detecting unit 107 are p[0]=1/3 and p[1]=4/5 from FIG. 11C. The ratio of the number of modules that satisfies Equation (3) is calculated by the calculating unit 109 to be Num[0]:Num[1]:Num[2]=15:5:4, and the module configuration is changed to a configuration shown in FIG. 11B.

Subsequently, the W1 section (Band_C(W1)) of Band_C is processed, and when the right-edge pixel of Band_C(W1) has been processed, the passage rates output by the passage rate detecting unit 107 are exactly the same values (p[0]=1/3 and p[1]=4/5) as those in the W0 section from FIG. 11C. In this case, because the ratio of the number of modules calculated by the calculating unit 109 is the same, the configuration is not changed. Thereafter, in the same manner, a configuration calculation and a configuration change are performed each time the right-edge pixel of each section has been processed, and thereby the sections W1 and W2 are sequentially processed.

A specific example of implementation of the module configuration changing unit 110 will be described next. FIG. 2 shows an example in which the following connections are implemented by the module configuration changing unit 110: the input signal (in0) of the controller 105→the discriminator 0→the discriminator 1→the discriminator 2→the output signal (out0) to the result storing unit 112. As shown in FIG. 2, this route can be implemented by the switches at the connecting portions being connected (ON).

A procedure for changing the number of discriminators for each stage will be described. It is assumed that, for example, the ratio of the number of modules that satisfies Equation (4) is calculated by the calculating unit 109 to be Num[0]:Num[1]:Num[2]=6:4:2. In this case, the discriminators 0 to 5 are mounted for the stage 0, the discriminators 6 to 9 are mounted for the stage 1, and the discriminators 10 and 11 are mounted for the stage 2. A parameter necessary for each stage processing is transferred to each discriminator by a control unit (not shown). Also, the route (switch) setting unit 114 establishes the following route as initial route settings.

in0→discriminator 0→discriminator 6→discriminator 10→out0
in1→discriminator 1→discriminator 7→discriminator 11→out1
in2→discriminator 2→discriminator 8
in3→discriminator 3→discriminator 9
in4→discriminator 4
in5→discriminator 5

The discriminators 8 and 9 are required to be connected to either the discriminator 10, 11 of the next stage, and the discriminators 4 and 5 are required to be connected to either the discriminator 6, 7, 8, 9 of the next stage, but they are unconnected in the initial route settings. The route (switch) setting unit 114 monitors the control signals (valid) output from the discriminators. For example, if while the discriminators 6 and 7 both are transferring data (the valid signals of the discriminators 6 and 7 being enabled), the route (switch) setting unit 114 detects that the valid signal of the discriminator 8 has been enabled, then, the route (switch) setting unit 114 waits for either the discriminator 6 or 7 that finishes data transfer (the valid signals being disabled) earlier (so the setting unit waits for whichever discriminator 6 or 7 finishes data processing first). If the discriminator 6 finishes data transfer earlier than the discriminator 7, the connection route is changed as follows immediately after the discriminator 6 has finished transferring data:

in0→discriminator 0→discriminator 6
in1→discriminator 1→discriminator 7→discriminator 11→out1
in2→discriminator 2→discriminator 8→discriminator 10→out0
in3→discriminator 3→discriminator 9
in4→discriminator 4
in5→discriminator 5.

The foregoing has been described taking the example in which a crossbar switch is used as an implementation of the module configuration changing unit 110, but in order to make it more general-purpose, it is also possible to employ a method for implementing the module configuration changing unit using a network (interconnect).

An example in which the module configuration changing unit 110 is implemented using a network (interconnect) will be described next with reference to FIGS. 12A and 12B. The identification result output by each of the discriminators 0 to 11 is input to the passage rate detecting unit 107. The discriminators are connected to a network (interconnect) 80. While identification processing is being executed on given rectangular image data, a status indicating "under processing" (for example, an assertion of a busy signal) is transmitted to the network 80. A communication route setting unit 111 mounted on the network 80 determines to which discriminator the processing result of which discriminator is transmitted, or in other words, a connection relationship between discriminators (topology).

For example, in a configuration shown in FIG. 12A, the outputs of the discriminators 0 to 2 sharing the processing of the stage 0 are set so as to be transmitted to the discriminators 3 to 5 sharing the processing of the stage 1. Likewise, the outputs of the discriminators 3 to 5 are set so as to be transmitted to the discriminators 6 to 8 sharing the processing of the stage 2. The content of the settings in the communication route setting unit 111 is determined based on the module configuration calculated by the calculating unit 109.

It is assumed that, for example, the ratio of the number of modules that satisfies Equation (3) is calculated by the calculating unit 109 to be Num[0]:Num[1]:Num[2]=6:2:1. In this case, the content of the settings in the communication route setting unit 111 can be changed such that the outputs of the discriminators 0 to 2, 5, 7 and 8 are transmitted to the discriminators 3 and 4, and the outputs of the discriminators 3 and 4 are transmitted to the discriminator 6. As a result, a configuration shown in FIG. 12B is implemented.

In the case where a plurality of descriminators are set as transmission destinations, the network 80 selects one from among the plurality of discriminators, which has not transmitted a status indicating "under processing" (not asserted a busy signal), and performs control so as to establish a connection. However, if all of the transmission destinations are involved in processing, the network 80 waits until at least one of them finishes processing, and then establishes a connection.

As a means for configuring the network (interconnect), various means are conceivable including the crossbar switch method described above, a ring method, a common bus method, and the like, but the efficacy of the present invention will not be compromised by any of the methods.

Other Embodiments

Figure 13:
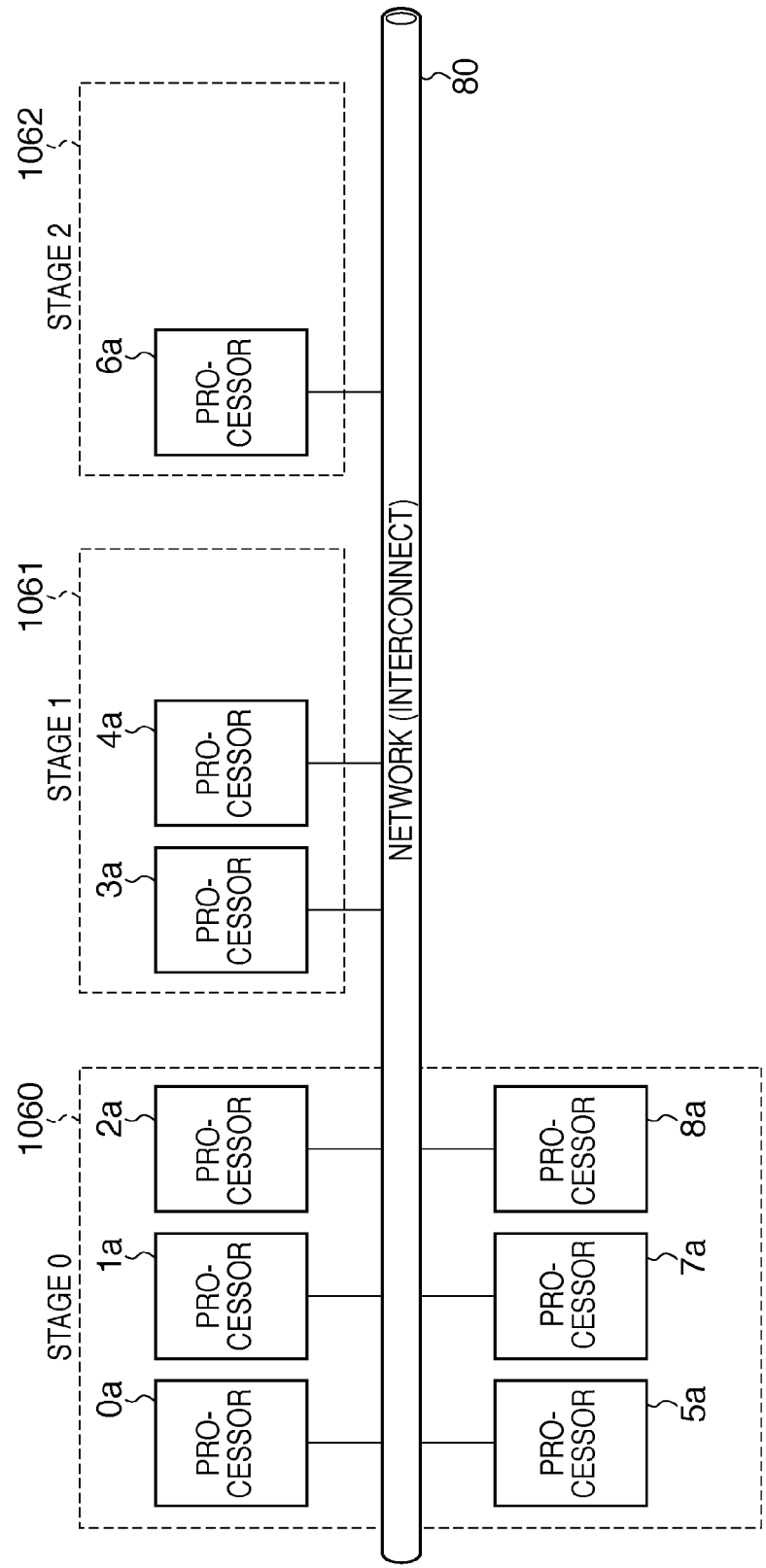
FIG. 13 is a diagram illustrating the case where the discriminators are implemented using processors.

Another embodiment will be described next with reference to FIG. 13. FIG. 13 is a diagram in which the discriminators of FIG. 12B are implemented with processors. With the implementation using processors, the identification module configuration change from FIG. 12A to FIG. 12B can be achieved simply by changing programs executed by the processors. Specifically, the configuration can be changed by:

changing a program executed by a processor 5a from a processing program of the stage 1 to a processing program of the stage 0; and changing programs executed by processors 7a and 8a from a processing program of the stage 2 to the processing program of the stage 0.

In identification processing, usually, the number of stages in the cascade can be as high as several tens of stages, and thus it may be difficult to mount at least one dedicated discriminator for each stage in terms of circuitry scale. In such a case, it is necessary to optimize the circuitry scale by, for example, integrating a plurality of consecutive stages and mounting a discriminator for an integrated stage. In the implementation using processors, integration of at least two consecutive stage processes and execution of the integrated stage by one processor can be achieved easily by changing programs.

In the above-described procedures performed to determine the optimal number of discriminators that should be mounted for each stage, the total number of discriminators was a given number. However, in the implementation using processors, in the case where there are a large number of stages, it is possible to easily perform integration of stage processes executed by a single processor. Accordingly, wider selection of configurations can be provided for the given total number of processors, whereby an even better module configuration can be determined.

Also, according to the above-described embodiments, passage rates for all stages are acquired to change module configuration. However, the present invention is not limited to this. The calculation of the passage rate and the change of the module configuration may be perfomed for a subset of stage(s) whose degree of passage rate variability is (relatively) large. This arrangement is expected to enhance the effects of the invention on the whole.

According to the above-decribed embodiments, the module configuration (the degree of spatial parallelism of each stage, or in other words, the number of discriminators that should be mounted for each stage) is dynamically changed based on the passage rate detected for each stage processing and the processing time of each stage. Accordingly, the present invention has the effect that there is little performance variation depending on the type of input image or the processing position within an image, and a uniform and high level of processing performance can be acquired.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-112661, filed May 14, 2010, which is hereby incorporated by reference herein in its entirety.

What is claimed is:

1. A data processing apparatus including a plurality of processors configured to sequentially execute data processing on a plurality of partial data of input data through a plurality of stages, wherein, in the data processing, it is determined, depending on a processing result of data in a preceding stage, whether or not to execute processing of data in a stage subsequent to the preceding stage, the apparatus comprising:

a CPU coupled to a memory, wherein the CPU is programmed to provide:

a connecting unit configured to allocate the plurality of processors over the plurality of stages, and to connect the plurality of processors such that a plurality of partial data pieces are processed in parallel;

a detecting unit configured to detect and update, sequentially, with respect to at least one of the plurality of stages, a ratio of an amount of data that has been processed in a stage to an amount of data that is to be processed in the stage, as a passage rate;

a calculation unit configured to calculate, each time the data processing has been executed on a predetermined number of partial data of the input data, respective numbers of processors to be allocated to the plurality of stages based on the passage rate detected by the detecting unit at a current time, if the passage rate has been changed from a previous time; and a changing unit configured to change a connection between the plurality of processors connected by the connecting unit so that the respective numbers of processors calculated by the calculation unit are allocated to the plurality of stages.

2. The apparatus according to claim 1, wherein the calculation unit calculates the number of processors to be allocated to each stage according to a ratio of the data amount among stages.

3. The apparatus according to claim 1, wherein the memory is configured to store a processing time required to process the partial data with respect to each of the plurality of processors, and wherein the calculation unit:

calculates an accumulated passage rate for each stage based on the passage rates for preceding stages; and calculates the number of processors to be allocated to each stage such that, for each stage, a processing time, calculated based on the accumulated passage rate, is uniform.

4. The apparatus according to claim 1, wherein the detecting unit detects the passage rate for each of a predetermined data amount of the input data, wherein the calculation unit calculates the number of processors to be allocated to each stage based on the passage rate detected for the predetermined data amount, and wherein the changing unit changes, for the predetermined data amount, the connection between the plurality of processors connected by the connecting unit according to the number of processors to be allocated to each stage calculated by the calculation unit.

5. The apparatus according to claim 1, wherein the changing unit monitors whether or not processing by the processors has been completed, and, when the number of processors allocated by the connecting unit differs between adjacent stages, the changing unit connects a processor of the stage preceding the subsequent stage to a processor of the subsequent stage whose processing has been completed, in an order in which processing of the processors in the preceding stage was completed.

6. A data processing method in a data processing apparatus including a plurality of processors configured to sequentially execute data processing on a plurality of partial data of input data through a plurality of stages, wherein, in the data processing, it is determined, depending on a processing result of data in a preceding stage, whether or not to execute processing of the data in a stage subsequent to the preceding stage, the method comprising steps of:

allocating the plurality of processors over the plurality of stages;

connecting the plurality of processors such that a plurality of partial data pieces are processed in parallel;

detecting and updating, sequentially, with respect to at least one of the plurality of stages, a ratio of an amount of data that has been processed in a stage to an amount of data that is to be processed in the stage, as a passage rate;

calculating, each time the data processing has been executed on a predetermined number of partial data of the input data, respective numbers of processors to be allocated to the plurality of stages based on the passage rate detected in the detecting step at a current time, if the passage rate has been changed from a previous time; and changing a connection between the plurality of processors connected in the connecting step so that the respective numbers of processors calculated in the calculating step are allocated to the plurality of stages.

* * * * *